United States Patent
Lee et al.

(10) Patent No.: US 10,477,243 B2
(45) Date of Patent: *Nov. 12, 2019

(54) METHOD AND APPARATUS FOR PREDICTING AND RESTORING A VIDEO SIGNAL USING PALETTE ENTRY AND PALETTE MODE

(71) Applicant: KT CORPORATION, Gyeonggi-do (KR)

(72) Inventors: Bae Keun Lee, Seoul (KR); Joo Young Kim, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/545,053

(22) PCT Filed: Jan. 29, 2016

(86) PCT No.: PCT/KR2016/001007
§ 371 (c)(1),
(2) Date: Jul. 20, 2017

(87) PCT Pub. No.: WO2016/122251
PCT Pub. Date: Aug. 4, 2016

(65) Prior Publication Data
US 2018/0020236 A1 Jan. 18, 2018

(30) Foreign Application Priority Data

Jan. 29, 2015 (KR) .................. 10-2015-0014539
Jan. 29, 2015 (KR) .................. 10-2015-0014540
Jan. 29, 2015 (KR) .................. 10-2015-0014541

(51) Int. Cl.
*H04N 19/593* (2014.01)
*G06T 11/00* (2006.01)
(Continued)

(52) U.S. Cl.
CPC .......... *H04N 19/593* (2014.11); *G06T 11/001* (2013.01); *H04N 19/105* (2014.11);
(Continued)

(58) Field of Classification Search
None
See application file for complete search history.

(56) References Cited

U.S. PATENT DOCUMENTS 5,883,633 A * 3/1999 Gill .................. G06T 9/005
345/589
9,749,628 B2 * 8/2017 Chuang .................. H04N 19/70
(Continued)

FOREIGN PATENT DOCUMENTS

AU 2009243440 A1 6/2011
CN 1452397 A 10/2003
(Continued)

OTHER PUBLICATIONS

Vadim Seregin et al., "Non-SCCE3: Run-length coding for palette predictor", JCTVC-R0228, Joint Collaborative Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014, pp. 1-3.
(Continued)

*Primary Examiner* — Tyler W. Sullivan
(74) *Attorney, Agent, or Firm* — IP Legal Services, LLC

(57) ABSTRACT

Provided is a method for decoding a video signal. Such a method may include obtaining at least one palette entry of a current block from a palette map of a previous block, constructing a palette map of the current block including the obtained palette entry, deriving a palette index on a sample-by-sample basis of the current block, and reconstructing the current block by using the palette map of the current block and the palette index.

10 Claims, 11 Drawing Sheets

(51) Int. Cl.
*H04N 19/70* (2014.01)
*H04N 19/129* (2014.01)
*H04N 19/176* (2014.01)
*H04N 19/105* (2014.01)
*H04N 19/463* (2014.01)
*H04N 19/93* (2014.01)
*H04N 19/86* (2014.01)
*G06F 3/147* (2006.01)

(52) U.S. Cl.
CPC ......... *H04N 19/129* (2014.11); *H04N 19/176* (2014.11); *H04N 19/463* (2014.11); *H04N 19/70* (2014.11); *H04N 19/86* (2014.11); *H04N 19/93* (2014.11); *G06F 3/1475* (2013.01)

(56) References Cited

U.S. PATENT DOCUMENTS

| | | | |
|---|---|---|---|
| 9,942,551 B2* | 4/2018 | Karczewicz | H04N 19/70 |
| 2003/0161541 A1 | 8/2003 | Ridge | |
| 2003/0198291 A1 | 10/2003 | Gold | |
| 2003/0198292 A1 | 10/2003 | Gold | |
| 2004/0067041 A1 | 4/2004 | Seo et al. | |
| 2005/0237951 A1 | 10/2005 | Yang et al. | |
| 2008/0030517 A1 | 2/2008 | Chuang | |
| 2008/0144952 A1 | 6/2008 | Chen et al. | |
| 2008/0273804 A1 | 11/2008 | Malewski | |
| 2009/0010533 A1 | 1/2009 | Hung | |
| 2009/0232394 A1 | 9/2009 | Yang et al. | |
| 2011/0044542 A1 | 2/2011 | Kuwahara | |
| 2011/0064131 A1 | 3/2011 | Park et al. | |
| 2011/0064132 A1 | 3/2011 | Park et al. | |
| 2011/0064133 A1 | 3/2011 | Park et al. | |
| 2011/0064324 A1 | 3/2011 | Park et al. | |
| 2011/0064325 A1 | 3/2011 | Park et al. | |
| 2011/0110416 A1 | 5/2011 | Lawrence | |
| 2011/0112667 A1 | 5/2011 | Lawrence | |
| 2011/0170771 A1 | 7/2011 | Yang et al. | |
| 2011/0279474 A1 | 11/2011 | Yang et al. | |
| 2012/0301022 A1 | 11/2012 | Yang et al. | |
| 2013/0114676 A1 | 5/2013 | Guo et al. | |
| 2013/0114738 A1 | 5/2013 | Chien et al. | |
| 2013/0188707 A1 | 7/2013 | Shimizu et al. | |
| 2014/0192866 A1 | 7/2014 | Cohen et al. | |
| 2014/0301474 A1 | 10/2014 | Guo et al. | |
| 2014/0301475 A1 | 10/2014 | Guo et al. | |
| 2015/0010053 A1 | 1/2015 | Xu et al. | |
| 2015/0016501 A1 | 1/2015 | Guo et al. | |
| 2015/0264365 A1 | 9/2015 | Tsai et al. | |
| 2015/0281728 A1* | 10/2015 | Karczewicz | H04N 19/93 375/240.16 |
| 2015/0312568 A1 | 10/2015 | Lainema et al. | |
| 2015/0341674 A1 | 11/2015 | Seregin et al. | |
| 2016/0037164 A1 | 2/2016 | Joshi et al. | |
| 2016/0057434 A1* | 2/2016 | Lai | H04N 19/176 382/233 |
| 2016/0094851 A1 | 3/2016 | Pu et al. | |
| 2016/0100179 A1* | 4/2016 | He | H04N 19/176 375/240.25 |
| 2016/0105676 A1* | 4/2016 | Pu | H04N 19/13 375/240.24 |
| 2016/0227217 A1 | 8/2016 | Karczewicz et al. | |
| 2016/0227239 A1* | 8/2016 | Pu | H04N 19/593 |
| 2016/0227254 A1 | 8/2016 | Karczewicz et al. | |
| 2016/0286217 A1* | 9/2016 | Hsiang | H04N 19/91 |
| 2016/0309177 A1 | 10/2016 | Laroche et al. | |
| 2016/0309183 A1 | 10/2016 | Sun et al. | |
| 2016/0323584 A1 | 11/2016 | Chuang et al. | |
| 2016/0345030 A1* | 11/2016 | Karczewicz | H04N 19/176 |
| 2017/0127058 A1* | 5/2017 | Misra | H04N 19/70 |
| 2017/0295376 A1 | 10/2017 | Lee et al. | |
| 2017/0302937 A1* | 10/2017 | Lee | H04N 19/103 |
| 2017/0310992 A1* | 10/2017 | Lee | H04N 19/593 |
| 2017/0347114 A1* | 11/2017 | Lee | H04N 19/50 |
| 2017/0374366 A1* | 12/2017 | Xiu | H04N 19/176 |
| 2018/0020237 A1* | 1/2018 | Lee | H04N 19/186 |
| 2018/0098092 A1 | 4/2018 | Ye et al. | |
| 2018/0098093 A1 | 4/2018 | Ye et al. | |
| 2018/0109798 A1* | 4/2018 | Lee | H04N 19/50 |
| 2018/0205951 A1* | 7/2018 | Hsiang | H04N 19/70 |
| 2019/0174130 A1* | 6/2019 | Hsiang | H04N 19/91 |
| 2019/0182490 A1 | 6/2019 | Lee et al. | |

FOREIGN PATENT DOCUMENTS

| | | |
|---|---|---|
| CN | 1602517 A | 3/2005 |
| CN | 101065779 A | 10/2007 |
| CN | 101340587 A | 1/2009 |
| CN | 102088604 A | 6/2011 |
| CN | 102523367 A | 6/2012 |
| CN | 102833463 A | 12/2012 |
| CN | 103119941 A | 5/2013 |
| CN | 106797473 A | 5/2017 |
| CN | 107079151 A | 8/2017 |
| CN | 107079163 A | 8/2017 |
| JP | 2012-074918 A | 4/2012 |
| KR | 10-2011-0011505 A | 2/2011 |
| KR | 10-2014-0098120 A | 8/2014 |
| WO | 2012/043294 A1 | 4/2012 |
| WO | 2013/070610 A1 | 5/2013 |
| WO | 2016/161967 A1 | 10/2016 |

OTHER PUBLICATIONS

Wei Pu et al., "Non-CE6: Improvement on Palette Sharing Mode", JCTVC-S0108r1, Joint Collaborative Team on Video Coding (JCT-VC) of ITU-T SG 16 WP 3 and ISO/IEC JTC 1/SC 29/WG 11, 19th Meeting: Strasbourg, FR, Oct. 17-24, 2014, pp. 1-3.

Rajan Joshi et al., "CE6 subtest A.5: Contexts for run coding in palette mode", JCTVC-S0038, Joint Collaborative Team on Video Coding (JCT-VC) of ITU-T SG 16 WP 3 and ISO/IEC JTC 1/SC 29/WG 11, 19th Meeting: Strasbourg, FR, Oct. 17-24, 2014, pp. 1-7.

Jianle Chen et al., "Description of screen content coding technology proposal by Qualcomm", JCTVC-Q0031, Joint Collaborative Team on Video Coding (JCT-VC) of ITU-T SG16 WP3 and ISO/IEC JTC1/SC29/WG11, 17th Meeting: Valencia, ES, Mar. 27-Apr. 4, 2014, pp. 1-19.

Shih-Ta Hsiang et al., "Run coding of the palette index map using a universal entropy coding scheme", JCTVC-R0136, Joint Collaborative Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014, pp. 1-7.

Guillaume Laroche et al., "AhG10:Run coding for palette mode", JCTVC-Q0066, Joint Collaborative Team on Video Coding (JCT-VC) of ITU-T SG 16 WP 3 and ISO/IEC JTC 1/SC 29/WG 11, 17th Meeting: Valencia, ES, Mar. 27-Apr. 4, 2014, pp. 1-2.

Liwei Guo et al., "Palette Mode for Screen Content Coding", JCTVC-M0323, Joint Collaborative Team on Video Coding (JCT-VC) of ITU-T SG 16 WP 3 and ISO/IEC JTC 1/SC 29/WG 11, 13th Meeting: Incheon, KR, Apr. 18-26, 2013, pp. 1-5.

Liwei Guo et al., "Color Palette for Screen Content Coding", 2014 IEEE ICIP, Oct. 27-30, 2014, pp. 5556-5560.

Zhan Ma et al., "Advanced Screen Content Coding Using Color Table and Index Map", IEEE Transactions on Image Processing, Oct. 2014, pp. 4399-4412, vol. 23, No. 10.

Seung-Hwan Kim et al., "Non-SCCE3: High throughput palette coding", CTVC-R0232, Joint Collaborative Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014, pp. 1-7.

Wei Pu et al., "Non-CE6: Syntax Redundancy Fixes for Palette Mode", JCTVC-S0110r1, Joint Collaborative Team on Video Coding (JCT-VC) of ITU-T SG 16 WP 3 and ISO/IEC JTC 1/SC 29/WG 11, 19th Meeting: Strasbourg, FR, Oct. 17-24, 2014, pp. 1-8.

Rajan Joshi et al., "High Efficiency Video Coding (HEVC) Screen Content Coding: Draft 1", JCTVC-R1005-v3, Joint Collaborative

(56) References Cited

OTHER PUBLICATIONS

Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014, pp. 1-360.

Liwei Guo et al., "Evaluation of Palette Mode Coding on HM-12.0+RExt-4.1", JCTVC-O0218, Joint Collaborative Team on Video Coding (JCT-VC) of ITU-T SG 16 WP 3 and ISO/IEC JTC 1/SC 29/WG 11, 15th Meeting: Geneva, CH, Oct. 23-Nov. 1, 2013, pp. 1-7.

Rajan Joshi et al., "High Efficiency Video Coding (HEVC) Screen Content Coding: Draft 2", Document: JCTVC-S1005, Joint Collaborative Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014, pp. 1-350.

Yu-Chen Sun et al., "CE1-related: Harmonization between JCTVC-T0065 Non CE1: Grouping Palette Indices at Front and CE1 Test A.1.5", Document: JCTVC-T0233, Joint Collaborative Team on Video Coding (JCT-VC) of ITU-T SG 16 WP 3 and ISO/IEC JTC 1/SC 29/WG 11, 20th Meeting: Geneva, CH, Feb. 10-18, 2015, pp. 1-6.

Vadim Seregin, "Non-CE6: Cross-check of removal of parsing dependency in palette-based coding (JCTVC-S0181)", Document: JCTVC-S0256, Joint Collaborative Team on Video Coding (JCT-VC) of ITU-T SG 16 WP 3 and ISO/IEC JTC 1/SC 29/WG 11, 19th Meeting: Strasbourg, FR, Oct. 17-24, 2014, pp. 1-3.

Xiaoyu Xiu et al., "Non-CE6: Unification of coding of escape indices and other palette indices", Document: JCTVC-S0258, Joint Collaborative Team on Video Coding (JCT-VC) of ITU-T SG 16 WP 3 and ISO/IEC JTC 1/SC 29/WG 11, 19th Meeting: Strasbourg, FR, Oct. 17-24, 2014, pp. 1-7.

Xiaozhong Xu et al., "CE1-related: escape pixel coding in palette mode", Document: JCTVC-T0076, Joint Collaborative Team on Video Coding (JCT-VC) of ITU-T SG 16 WP 3 and ISO/IEC JTC 1/SC 29/WG 11, 20th Meeting: Geneva, CH, Feb. 10-18, 2015, pp. 1-9.

Rajan Joshi et al., "High Efficiency Video Coding (HEVC) Screen Content Coding: Draft 2", Document: JCTVC-S1005, Joint Collaborative Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014, pp. 1-7.

Yuwen He et al., "Non-CE1: On palette sharing mode", JCTVC-T0206, Joint Collaborative Team on Video Coding (JCT-VC) of ITU-T SG16 WP3 and ISO/IEC JTC1/SC29/WG11, 20th Meeting: Geneva, CH, Feb. 10-18, 2015, pp. 1-5.

Rajan Joshi et al., "High Efficiency Video Coding (HEVC) Screen Content Coding: Draft 3", JCTVC-T1005, Joint Collaborative Team on Video Coding (JCT-VC) of ITU-T SG 16 WP 3 and ISO/IEC JTC 1/SC 29/WG 11, 20th Meeting: Geneva, CH, Feb. 10-Feb. 17, 2015, pp. 1-563.

Marta Karczewicz et al., "Non CE1: Grouping Palette Indices at Front", JCTVC-T0065r2, Joint Collaborative Team on Video Coding (JCT-VC) of ITU-T SG 16 WP 3 and ISO/IEC JTC 1/SC 29/WG 11, 20th Meeting: Geneva, CH, Feb. 10-18, 2015, pp. 1-3.

Seung-Hwan Kim et al., "Non-SCCE3: High throughput palette coding", Document: JCTVC-R0232, Joint Collaborative Team on Video Coding (JCT-VC) of ITU-T SG 16 WP 3 and ISO/IEC JTC 1/SC 291WG 11, 18th Meeting: Sapporo, JP, Jun. 30-Jul. 9, 2014, pp. 1-7.

\* cited by examiner

FIG. 7

| palette_coding( x0, y0, nCbS ) { | Descriptor |
|---|---|
|   palette_share_flag[ x0 ][ y0 ] | ae(v) |
|   if( !palette_share_flag[ x0 ][ y0 ] ) { | |
|     palettePredictionFinished = 0 | |
|     paletteNumPredictedEntries = 0 | |
|     for( i = 0; i < PredictorPaletteSize<br>  && !palettePredictionFinished &&<br>    paletteNumPredictedEntries < palette_max_size; i++ ) { | |
|       palette_predictor_run | ae(v) |
|       if( palette_predictor_run != 1 ) | |
|         if( palette_predictor_run > 1 ) | |
|           i += palette_predictor_run − 1 | |
|       PalettePredictorEntryReuseFlag[ i ] = 1 | |
|       paletteNumPredictedEntries ++ | |
|       } else | |
|         palettePredictionFinished = 1 | |
|     } | |
|     if( paletteNumPredictedEntries < palette_max_size ) | |
|       if( paletteNumPredictedEntries != previousPaletteSize) | |
|         palette_num_signalled_entries | ae(v) |
|       if( paletteNumPredictedEntries == previousPaletteSize) | |
|         palette_num_signalled_entries_minus1 | ae(v) |
|     for( cIdx = 0; cIdx < 3; cIdx++ ) | |
|       for( i = 0; i < palette_num_signalled_ entries; i++ ) | |
|         palette_entry | ae(v) |
|   } | |
|     ... | |
| } | |

FIG. 11

| | Descriptor |
|---|---|
| palette_coding( x0, y0, nCbS ) { | |
| ... | ae(v) |
| if( currentPaletteSize != 0 ) | |
|     palette_escape_val_present_flag | ae(v) |
| ... | |
| if( indexMax > 0 ) | |
|     palette_transpose_flag | ae(v) |
| scanPos = 0 | |
| while( scanPos < nCbS * nCbS ) { | |
|   xC = x0 + travScan[ scanPos ][ 0 ] | |
|   yC = y0 + travScan[ scanPos ][ 1 ] | |
|   if( scanPos > 0) { | |
|     xcPrev = x0 + travScan[ scanPos - 1 ][ 0 ] | |
|     ycPrev = y0 + travScan[ scanPos - 1 ][ 1 ] | |
|   } | |
|   if(indexMax > 0 && scanPos >= nCbS && palette_run_type_flag[xcPrev][ycPrev]! = COPY_ABOVE_MODE && !(palette_escape_val_present_flag == 1 && currentPaletteSize == 1)) { | |
|     palette_run_type_flag[ xC ][ yC ] | ae(v) |
|   } | |
|   if( palette_run_type_flag[ xC ][ yC ] = = COPY_INDEX_MODE && adjustedIndexMax > 0 &&!(palette_escape_val_present_flag ==1&& currentPaletteSize == 1)) | |
|     palette_index_idc | ae(v) |
| ... | |
| } | |

S1100 — palette_escape_val_present_flag
S1110 — palette_run_type_flag[ xC ][ yC ]
S1120 — palette_index_idc

METHOD AND APPARATUS FOR PREDICTING AND RESTORING A VIDEO SIGNAL USING PALETTE ENTRY AND PALETTE MODE

CROSS REFERENCE TO RELATED APPLICATIONS

This application is a National Stage Patent Application of PCT International Patent Application No. PCT/KR2016/001007 (filed on Jan. 29, 2016) under 35 U.S.C. § 371, which claims priority to Korean Patent Application Nos. 10-2015-0014539 (filed on Jan. 29, 2015), 10-2015-0014540 (filed on Jan. 29, 2015), and 10-2015-0014541 (filed on Jan. 29, 2015), the teachings of which are incorporated herein in their entireties by reference.

TECHNICAL FIELD

The present invention relates to a method and a device for processing a video signal.

BACKGROUND ART

Demands for high-resolution, high-quality images such as High Definition (HD) images and Ultra High Definition (UHD) images have recently increased in various fields of applications. As video data has a higher resolution and higher quality, the video data is larger in amount than traditional video data. Therefore, if video data is transmitted on an existing medium such as a wired/wireless wideband circuit or stored in an existing storage medium, transmission cost and storage cost increase. To avert these problems encountered with higher-resolution, higher-quality video data, high-efficiency video compression techniques may be used.

There are a variety of video compression techniques including inter-picture prediction in which pixel values included in a current picture are predicted from a picture previous to or following the current picture, intra-picture prediction in which pixel values included in a current picture are predicted using pixel information in the current picture, and entropy encoding in which a short code is assigned to a more frequent value and a long code is assigned to a less frequent value. Video data may be compressed effectively and transmitted or stored, using such a video compression technique.

Along with the increasing demands for high-resolution videos, demands for three-dimensional (3D) video content as a new video service have been increasing. A video compression technique for effectively providing HD and UHD 3D video content is under discussion.

DISCLOSURE

Technical Problem

An object of the present invention is to provide a method and apparatus for predicting or restoring a video signal based on a palette mode in encoding/decoding a video signal.

An object of the present invention is to provide a method and apparatus for constructing a palette map of a block to be encoded/decoded in encoding/decoding a video signal.

An object of the present invention is to provide a method and apparatus for deriving a palette index of a block to be encoded/decoded in encoding/decoding a video signal.

Technical Solution

A method for decoding a video signal according to the present invention comprises obtaining at least one palette entry of a current block from a palette map of a previous block, constructing a palette map of the current block including the obtained palette entry, deriving a palette index in a unit of a sample of the current block, and reconstructing the current block by using a palette map of the current block and the palette index.

In the video signal decoding method according to the present invention, a palette entry of the current block is determined based on a reuse flag (PredictorPaletteEntryReuseFlag) indicating whether a palette entry included in a palette map of the previous block is reused as a palette entry of the current block.

In the video signal decoding method according to the present invention, the reuse flag is derived based on a palette prediction run (pallete_predictor_run) signaled from a bitstream.

In the video signal decoding method according to the present invention, the palette prediction run is information encoded to specify a number of a reuse flag equal to 0 existing between non-zero reuse flags.

In the video signal decoding method according to the present invention, if a value of the signaled palette prediction run is 1, a step of obtaining palette entry of a current block from a palette map of the previous block is ended.

An apparatus for decoding a video signal according to the present invention comprises a prediction unit for obtaining at least one palette entry of a current block from a palette map of a previous block, constructing a palette map of the current block including the obtained palette entry, deriving palette index in a unit of a sample of the current block, and reconstructing the current block by using a palette map of the current block and the palette index.

In the video signal decoding apparatus according to the present invention, a palette entry of the current block is determined based on a reuse flag (PredictorPaletteEntryReuseFlag) indicating whether a palette entry included in a palette map of the previous block is reused as a palette entry of the current block.

In the video signal decoding apparatus according to the present invention, the prediction unit the reuse flag based on a palette prediction run (palette_predictor_run) signaled from a bitstream.

In the video signal decoding apparatus according to the present invention, the palette prediction run is information encoded to specify a number of a reuse flag equal to 0 existing between non-zero reuse flags.

In the video signal decoding apparatus according to the present invention, the prediction unit ends to obtain a palette entry of a current block from a palette map of the previous block when a value of the signaled palette prediction run is 1.

A method for encoding a video signal according to the present invention comprises obtaining at least one palette entry of a current block from a palette map of a previous block, constructing a palette map of the current block including the obtained palette entry, determining a palette index in a unit of a sample of the current block, and reconstructing the current block by using a palette map of the current block and the palette index.

In the video signal encoding method according to the present invention, a palette entry of the current block is determined based on a reuse flag (PredictorPaletteEntryReuseFlag) indicating whether a palette entry included in a palette map of the previous block is reused as a palette entry of the current block.

In the video signal encoding method according to the present invention, the reuse flag is derived based on an encoded palette prediction run (palette_predictor_run).

In the video signal encoding method according to the present invention, the palette prediction run is encoded by adding 1 to a number of a reuse flag equal to 0 existing between non-zero reuse flags.

In the video signal encoding method according to the present invention, if a value of the encoded palette prediction run is 1, a step of obtaining palette entry of a current block from a palette map of the previous block is ended.

An apparatus for encoding a video signal according to the present invention comprises a prediction unit for obtaining at least one palette entry of a current block from a palette map of a previous block, constructing a palette map of the current block including the obtained palette entry, deriving palette index in a unit of a sample of the current block, and reconstructing the current block by using a palette map of the current block and the palette index.

In the video signal encoding apparatus according to the present invention, a palette entry of the current block is determined based on a reuse flag (PredictorPaletteEntryReuseFlag) indicating whether a palette entry included in a palette map of the previous block is reused as a palette entry of the current block.

In the video signal encoding apparatus according to the present invention, the prediction unit derives the reuse flag based on an encoded palette prediction run (palette_predictor_run).

In the video signal encoding apparatus according to the present invention, the palette prediction run is encoded by adding 1 to a number of a reuse flag equal to 0 existing between non-zero reuse flags.

In the video signal encoding apparatus according to the present invention, the prediction unit ends to obtain a palette entry of a current block from a palette map of the previous block when a value of the encoded palette prediction run is 1.

Advantageous Effects

According to the present invention, it is possible to improve the efficiency of prediction or restoration of a block to be encoded/decoded based on a palette mode.

According to the present invention, the palette entry encoding/decoding efficiency can be improved by deriving the palette map of the block to be encoded/decoded from the palette map of the previous block.

According to the present invention, a palette index of a block to be encoded/decoded can be efficiently derived based on an index mode or a copy mode.

According to the present invention, the compression efficiency can be improved by encoding the palette index using the binary vector based on the run encoding.

According to the present invention, the sample values of the block to be encoded/decoded can be restored based on the escape mode, so that the samples out of the palette entry range can be efficiently encoded/decoded.

DESCRIPTION OF DRAWINGS

FIG. 7 illustrates a method to construct palette map relating to the current block, according to an embodiment of the present invention.

FIG. 11 illustrates a method to obtain a palette index based on an escape present flag, according to an embodiment of the present invention.

BEST MODE FOR CARRYING OUT THE INVENTION

Figure 1:
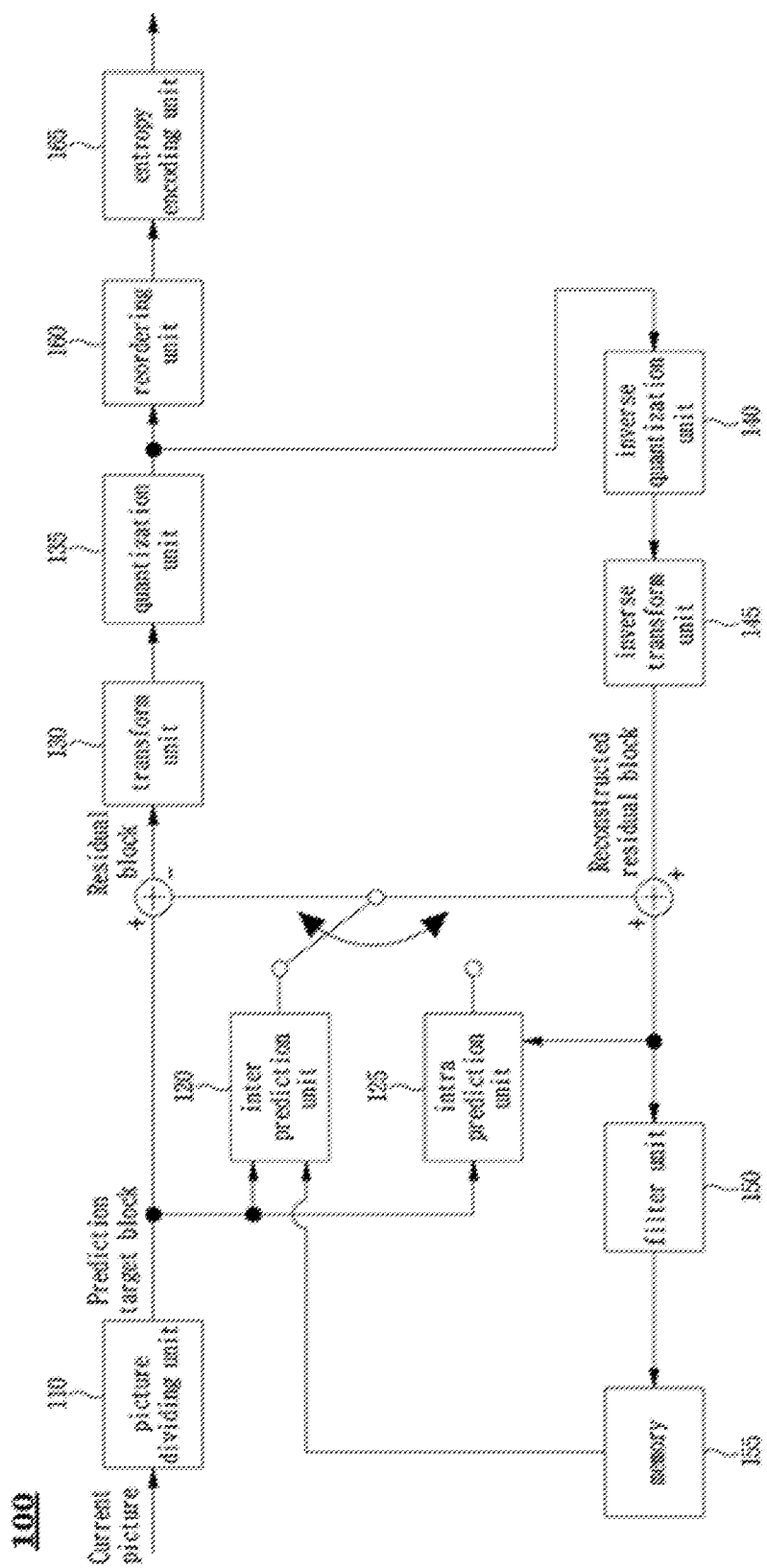
FIG. 1 is a block diagram illustrating a video encoding apparatus according to an embodiment of the present invention.

A method for decoding a video signal according to the present invention comprises obtaining at least one palette entry of a current block from a palette map of a previous block, constructing a palette map of the current block including the obtained palette entry, deriving a palette index in a unit of a sample of the current block, and reconstructing the current block by using a palette map of the current block and the palette index.

In the video signal decoding method according to the present invention, a palette entry of the current block is determined based on a reuse flag (PredictorPaletteEntryReuseFlag) indicating whether a palette entry included in a palette map of the previous block is reused as a palette entry of the current block.

In the video signal decoding method according to the present invention, the reuse flag is derived based on a palette prediction run (pallete_predictor_run) signaled from a bitstream.

In the video signal decoding method according to the present invention, the palette prediction run is information encoded to specify a number of a reuse flag equal to 0 existing between non-zero reuse flags.

In the video signal decoding method according to the present invention, if a value of the signaled palette prediction run is 1, a step of obtaining palette entry of a current block from a palette map of the previous block is ended.

An apparatus for decoding a video signal according to the present invention comprises a prediction unit for obtaining at least one palette entry of a current block from a palette map of a previous block, constructing a palette map of the current block including the obtained palette entry, deriving palette index in a unit of a sample of the current block, and reconstructing the current block by using a palette map of the current block and the palette index.

In the video signal decoding apparatus according to the present invention, a palette entry of the current block is determined based on a reuse flag (PredictorPaletteEntryReuseFlag) indicating whether a palette entry included in a palette map of the previous block is reused as a palette entry of the current block.

In the video signal decoding apparatus according to the present invention, the prediction unit the reuse flag based on a palette prediction run (palette_predictor_run) signaled from a bitstream.

In the video signal decoding apparatus according to the present invention, the palette prediction run is information encoded to specify a number of a reuse flag equal to 0 existing between non-zero reuse flags.

In the video signal decoding apparatus according to the present invention, the prediction unit ends to obtain a palette entry of a current block from a palette map of the previous block when a value of the signaled palette prediction run is 1.

A method for encoding a video signal according to the present invention comprises obtaining at least one palette entry of a current block from a palette map of a previous block, constructing a palette map of the current block including the obtained palette entry, determining a palette index in a unit of a sample of the current block, and reconstructing the current block by using a palette map of the current block and the palette index.

In the video signal encoding method according to the present invention, a palette entry of the current block is determined based on a reuse flag (PredictorPaletteEntryReuseFlag) indicating whether a palette entry included in a palette map of the previous block is reused as a palette entry of the current block.

In the video signal encoding method according to the present invention, the reuse flag is derived based on an encoded palette prediction run (palette_predictor_run).

In the video signal encoding method according to the present invention, the palette prediction run is encoded by adding 1 to a number of a reuse flag equal to 0 existing between non-zero reuse flags.

In the video signal encoding method according to the present invention, if a value of the encoded palette prediction run is 1, a step of obtaining palette entry of a current block from a palette map of the previous block is ended.

An apparatus for encoding a video signal according to the present invention comprises a prediction unit for obtaining at least one palette entry of a current block from a palette map of a previous block, constructing a palette map of the current block including the obtained palette entry, deriving palette index in a unit of a sample of the current block, and reconstructing the current block by using a palette map of the current block and the palette index.

In the video signal encoding apparatus according to the present invention, a palette entry of the current block is determined based on a reuse flag (PredictorPaletteEntryReuseFlag) indicating whether a palette entry included in a palette map of the previous block is reused as a palette entry of the current block.

In the video signal encoding apparatus according to the present invention, the prediction unit derives the reuse flag based on an encoded palette prediction run (palette_predictor_run).

In the video signal encoding apparatus according to the present invention, the palette prediction run is encoded by adding 1 to a number of a reuse flag equal to 0 existing between non-zero reuse flags.

In the video signal encoding apparatus according to the present invention, the prediction unit ends to obtain a palette entry of a current block from a palette map of the previous block when a value of the encoded palette prediction run is 1.

Mode for Carrying Out the Invention

The present invention may be changed and modified variously and be illustrated with reference to different exemplary embodiments, some of which will be described and shown in the drawings. However, these embodiments are not intended for limiting the invention but are construed as including includes all modifications, equivalents and replacements which belong to the spirit and technical scope of the invention. Like reference numerals in the drawings refer to like elements throughout.

Although the terms first, second, etc. may be used to describe various elements, these elements should not be limited by these terms. These terms are used only to distinguish one element from another element. For example, a first element could be termed a second element and a second element could be termed a first element likewise without departing from the teachings of the present invention. The term "and/or" includes any and all combinations of a plurality of associated listed items.

It will be understood that when an element is referred to as being "connected to" or "coupled to" another element, the element can be directly connected or coupled to another element or intervening elements. On the contrary, when an element is referred to as being "directly connected to" or "directly coupled to" another element, there are no intervening elements present.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "include" and/or "have," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments of the invention will be described in detail with reference to the accompanying drawings. Like reference numerals in the drawings refer to like elements throughout, and redundant descriptions of like elements will be omitted herein.

FIG. 1 is a block diagram illustrating a video encoding apparatus according to an embodiment of the present invention.

Referring to FIG. 1, the video encoding apparatus 100 includes a picture dividing unit 110, prediction units 120 and 125, a transform unit 130, a quantization unit 135, a reordering unit 160, an entropy encoding unit 165, an inverse quantization unit 140, an inverse transform unit 145, a filter unit 150, and a memory 155.

Each of the elements shown in FIG. 1 is shown independently to represent different characteristic functions in the video encoding apparatus, and does not mean that each element is composed of separate hardware or one software configuration unit. That is, the elements are independently arranged for convenience of description, wherein at least two elements may be combined into a single element, or a single element may be divided into a plurality of elements to perform functions. It is to be noted that embodiments in which some elements are integrated into one combined element and/or an element is divided into multiple separate elements are included in the scope of the present invention without departing from the essence of the present invention.

Some elements are not essential to the substantial functions in the invention and may be optional constituents for merely improving performance. The invention may be embodied by including only constituents essential to embodiment of the invention, except for constituents used to merely improve performance. The structure including only the essential constituents except for the optical constituents used to merely improve performance belongs to the scope of the invention.

The picture dividing unit 110 may divide an input picture into at least one processing unit. Here, the processing unit may be a prediction unit (PU), a transform unit (TU) or a coding unit (CU). The picture dividing unit 110 may divide one picture into a plurality of combinations of CUs, PUs and TUs and encode the picture by selecting one combination of CUs, PUs and TUs on the basis of a predetermined criterion (for example, a cost function).

For example, one picture may be partitioned into a plurality of CUs. A recursive tree structure, such as a quad tree structure, may be used to partition a picture into CUs. A CU, for which a picture or a CU of a maximum size may be as root, may be partitioned into sub-coding units with as many child nodes as the partitioned CUs. A CU which is not partitioned any more in accordance with a predetermined limitation is a leaf node. That is, assuming that a CU may be partitioned into quadrants only, a single CU may be partitioned into at most four different CUs.

In the embodiments of the invention, a CU may be used to refer to not only a unit of encoding but also a unit of decoding.

A PU may be partitioned into at least one square or rectangular form with the same size in a CU. For PUs partitioned from a same CU, a PU may have different shape and/or size from another PU.

When a PU for intra prediction is generated based on a CU and the CU is not a minimum CU, the CU may be subjected to intra prediction without being partitioned into plural PUs (N×N).

The prediction units 120 and 125 may include an inter prediction unit 120 to perform inter prediction and an intra prediction unit 125 to perform intra prediction. The prediction units 120 and 125 may determine which of inter prediction and intra prediction is performed on a PU, and may determine specific information (for example, an intra prediction mode, a motion vector, and a reference picture) of the determined prediction method. Here, a processing unit on which prediction is performed may be different from a processing unit for which a prediction method and specific information thereon are determined. For example, a prediction method and a prediction mode may be determined for each PU, while prediction may be performed for each TU. A residual value (residual block) between a generated predicted block and an original block may be input to the transform unit 130. Further, prediction mode information, motion vector information and the like used for prediction may be encoded along with the residual value by the entropy encoding unit 165 and be transmitted to the decoding apparatus. When a specific encoding mode is used, the original block may be encoded and transmitted to the decoding apparatus without generating a prediction block by the prediction units 120 and 125.

The inter prediction unit 120 may predict a PU based on information on at least one picture among a previous picture of a current picture and a subsequent picture of a current picture. In some cases, the inter prediction unit 120 may predict a PU based on information of a partially encoded region in the current picture. The inter prediction unit 120 may include a reference picture interpolation unit, a motion prediction unit, and a motion compensation unit.

The reference picture interpolation unit may be supplied with reference picture information from the memory 155 and generate pixel information less than or equal to an integer pixel on a reference picture. In the case of luma pixels, a DCT-based 8-tap interpolation filter with a variable filter coefficient may be used to generate pixel information less than or equal to an integer pixel in a unit of a ¼ pixel. In the case of chroma pixels, a DCT-based 4-tap interpolation filter with a variable filter coefficient may be used to generate pixel information less than or equal to an integer pixel in a unit of a ⅛ pixel.

The motion prediction unit may perform motion prediction on the basis of the reference picture interpolated by the reference picture interpolation unit. Various methods, such as a full search-based block matching algorithm (FBMA), a three-step search (TSS) algorithm and a new three-step search (NTS) algorithm, may be used to calculate a motion vector. A motion vector has a motion vector value in the unit of a ½ or ¼ pixel on the basis of an interpolated pixel. The motion prediction unit may predict a current PU using different motion prediction methods. Various methods, such as skip mode, merge mode, and advanced motion vector prediction (AMVP) mode, intra block copy mode, etc. may be used as the motion prediction method.

The intra prediction unit 125 may generate a PU on the basis of information on a reference pixel neighboring to a current block. When a reference pixel is a pixel for which inter prediction has been performed because a block neighboring to the current PU is a block for which inter prediction has been performed, information on a reference pixel in the block for which inter prediction has been performed may be replaced with information on a reference pixel in a block for which intra prediction has been performed. That is, when a reference pixel is not available, information on the unavailable reference pixel may be replaced with information on at least one reference pixel of the available reference pixels.

A prediction mode of intra prediction includes a directional prediction mode in which reference pixel information is used according to a prediction direction and a non-directional prediction mode in which information on direction is not used in performing prediction. A mode for predicting luma information and a mode for predicting chroma information may be different from each other. Further, intra prediction mode information used to obtain luma information or predicted luma signal information may be used to predict chroma information.

When a PU and a TU have the same size, intra prediction on the PU may be performed based on a left pixel, an upper-left pixel and an upper pixel of the PU. On the other hand, when a PU and a TU have different sizes, intra prediction may be performed by using reference pixels which are determined based on the TU. Intra prediction using NxN partitioning may be performed only for a minimum CU.

In the intra prediction method, a predicted block may be generated by applying an adaptive intra smoothing (AIS) filter to the reference pixels according to the prediction mode. Different types of AIS filters may be applied to the reference pixels. In the intra prediction method, the intra prediction mode of a current PU may be predicted from an intra prediction mode of a PU neighboring to the current PU. In predicting the prediction mode of the current PU using mode information predicted from a neighboring PU, when the current PU and the neighboring PU have the same intra prediction mode, information indicating that the current PU and the neighboring PU have the same prediction mode may be transmitted using predetermined flag information. When the current PU and the neighboring PU have different prediction modes, information on the prediction mode of the current block may be encoded by entropy encoding.

A residual block including residual information may be generated. The residual information is a difference between the original block of the PU and the predicted block of a PU generated by the prediction units 120 and 125. The generated residual block may be input to the transform unit 130.

The transform unit 130 may transform the residual block using a transform method such as Discrete Cosine Transform (DCT), Discrete Sine Transform (DST) or KLT. The residual block includes information on the residual between the PU generated by the prediction units 120 and 125 and the original block. A transform method to be used to transform the residual block may be determined among DCT, DST and KLT on the basis of the information on the intra prediction mode of the PU which is used to generate the residual block.

The quantization unit 135 may quantize values transformed into a frequency domain by the transform unit 130. A quantization coefficient may be changed depending on a block or importance of an image. Values output from the quantization unit 135 may be provided to the dequantization unit 140 and the rearrangement unit 160.

The rearrangement unit 160 may rearrange quantized coefficients.

The rearrangement unit 160 may change a two-dimensional (2D) block of coefficients into a one-dimensional (1D) vector of coefficients through coefficient scanning. For example, the rearrangement unit 125 may change a 2D block of coefficients into a 1D vector of coefficients by scanning from DC coefficients to coefficients of a high frequency domain using zigzag scanning. Vertical scanning for scanning a 2D block of coefficients in a vertical and horizontal scanning for scanning a 2D block of coefficients in a horizontal direction may be used depending on a size of a TU and an intra prediction mode, instead of zigzag scanning. That is, a scanning method may be selected based on the size of the TU and the intra prediction mode, among zigzag scanning, vertical scanning, and horizontal scanning.

The entropy encoding unit 165 may perform entropy encoding on the basis of the values obtained by the rearrangement unit 160. Various encoding methods, such as exponential Golomb coding, context-adaptive variable length coding (CAVLC), or context-adaptive binary arithmetic coding (CABAC), may be used for entropy encoding.

The entropy encoding unit 165 may encode a variety of information, such as residual coefficient information and block type information on a CU, prediction mode information, partitioning unit information, PU information, transfer unit information, motion vector information, reference frame information, block interpolation information and filtering information from the rearrangement unit 160 and the prediction units 120 and 125.

The entropy encoding unit 165 may entropy-encode coefficients of a CU input from the rearrangement unit 160.

The dequantization unit 140 and the inverse transform unit 145 dequantize the values which are quantized by the quantization unit 135 and inverse-transform the values which are transformed by the transform unit 130. A reconstructed block may be generated by adding the residual values to the predicted PU. The residual values may be generated by the dequantization unit 140 and the inverse transform unit 145. The predicted PU may be predicted by the motion vector prediction unit, the motion compensation unit, and the intra prediction unit of the prediction units 120 and 125.

The filter unit 150 may include at least one of a deblocking filter, an offset unit, and an adaptive loop filter (ALF).

The deblocking filter may remove block distortion generated by boundaries between blocks in a reconstructed picture. Whether to apply the deblocking filter to a current block may be determined on the basis of pixels included in several rows or columns of the block. When the deblocking filter is applied to a block, a strong filter or a weak filter may be applied depending on a required deblocking filtering strength. When horizontal filtering and vertical filtering are performed in applying the deblocking filter, the horizontal filtering and vertical filtering may be performed in parallel.

The offset unit may apply the offset with respect to the original image to the deblocking filtered image, in units of pixels. A region to which the offset may be applied may be determined after partitioning pixels of a picture into a predetermined number of regions. The offset may be applied to the determined region in consideration of edge information on each pixel or the method of applying the offset to the determined region.

The ALF may perform filtering based on a comparison result of the filtered reconstructed image and the original image. Pixels included in an image may be partitioned into predetermined groups, a filter to be applied to each group may be determined, and differential filtering may be performed for each group. Information on whether to apply the ALF may be transferred by each coding unit (CU) and a shape and filter coefficients of an ALF to be applied to each block may vary. Further, an ALF with the same form (fixed form) may be applied to a block regardless of characteristics of the block.

The memory 155 may store a reconstructed block or picture output from the filter unit 150, and the stored reconstructed block or picture may be supplied to the prediction units 120 and 125 when performing inter prediction.

Figure 2:
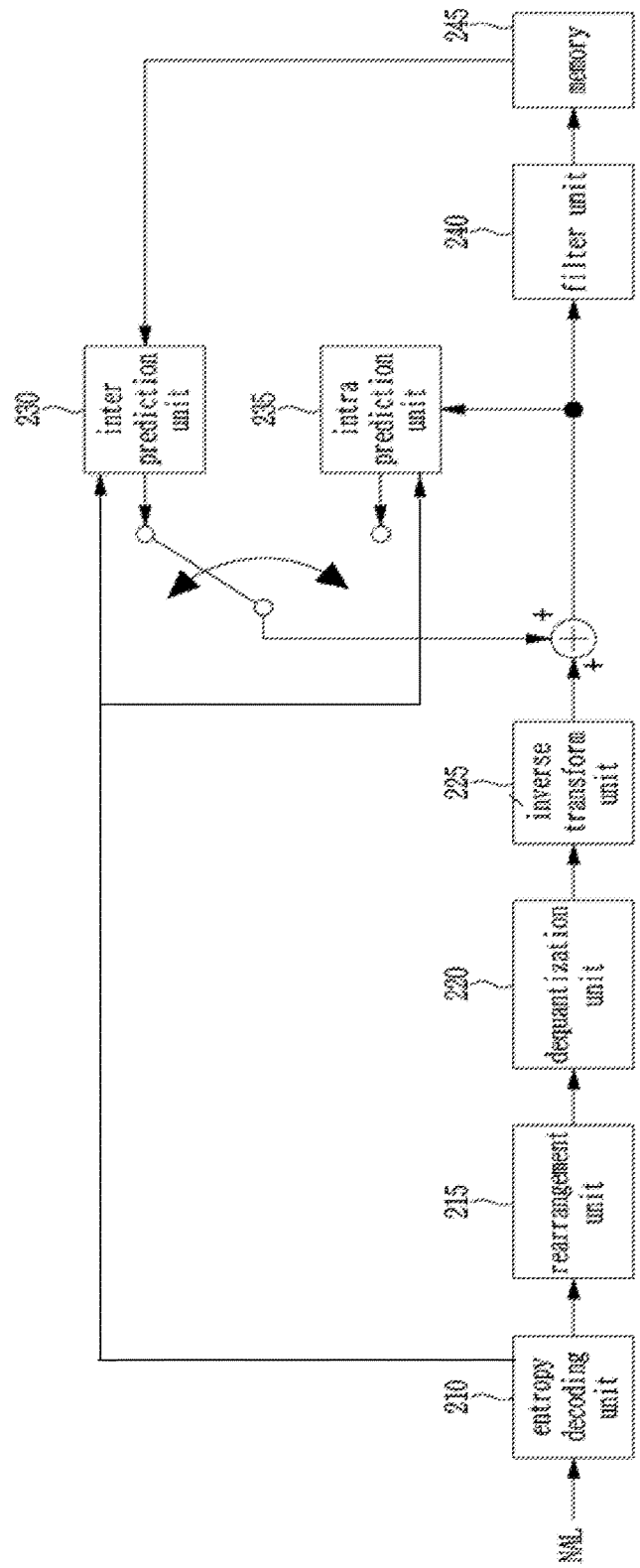
FIG. 2 is a block diagram illustrating an video decoding apparatus according to an embodiment of the present invention.

FIG. 2 is a block diagram illustrating a video decoding apparatus according an exemplary embodiment of the present invention.

Referring to FIG. 2, the video decoding apparatus 200 may include an entropy decoding unit 210, a rearrangement unit 215, a dequantization unit 220, an inverse transform unit 225, prediction units 230 and 235, a filter unit 240, and a memory 245.

When a video bitstream is input from the video encoding apparatus, the input bitstream may be decoded according to an inverse process of the video encoding process performed in the video encoding apparatus.

The entropy decoding unit 210 may perform entropy decoding according to an inverse process of the entropy encoding process by the entropy encoding unit of the video encoding apparatus. For example, various methods, such as exponential Golomb coding, CAVLC or CABAC, may be used for entropy encoding, corresponding to the method used by the video encoding apparatus.

The entropy decoding unit 210 may decode information associated with intra prediction and inter prediction performed by the encoding apparatus.

The rearrangement unit 215 may perform rearrangement on the bitstream entropy-decoded by the entropy decoding unit 210 on the basis of the rearrangement method of the encoding unit. The rearrangement unit 215 may reconstruct and rearrange coefficients of a 1D vector form into coefficients of a 2D block. The rearrangement unit 215 may be provided with information on coefficient scanning performed by the encoding apparatus and may perform rearrangement using a method of inversely scanning the coefficients, on the basis of scanning order performed by the encoding apparatus.

The dequantization unit 220 may perform dequantization on the basis of a quantization parameter provided from the encoding apparatus and the rearranged coefficients of the block.

The inverse transform unit 225 may perform inverse transform performed by the transform unit (that is, inverse DCT, inverse DST or inverse KLT) on a result of quantization performed by the video encoding apparatus. Inverse transform may be performed on the basis of a transfer unit determined by the video encoding apparatus. The transform unit 225 of the video decoding apparatus may selectively perform the transform scheme (e.g., DCT, DST, KLT) depending on a plurality of information elements, such as a prediction method, a size of the current block and a prediction direction, etc.

The prediction units 230 and 235 may generate a prediction block on the basis of information for generating prediction block and information on a previously-decoded block or picture provided. The information for generating prediction block may be provided from the entropy decoding unit 210. The information on a previously-decoded block or picture may be provided from the memory 245

Similarly to the operation of the video encoding apparatus as described above, when a PU and a TU have the same size, intra prediction on the PU is performed based on left pixels, an upper-left pixel and upper pixels of the PU. On the other hand, when a PU and a TU have different sizes, intra prediction may be performed using reference pixels which are determined based on the TU. Intra prediction using N×N partitioning may be used only for a minimum CU.

The prediction units 230 and 235 may include a PU determination unit, an inter prediction unit and an intra prediction unit. The PU determination unit may receive a variety of information, such as PU information, prediction mode information on an intra prediction method and motion prediction-related information on an inter prediction method, etc. from the entropy decoding unit 210, may determine a PU for a current CU. The PU determination unit may determine which of the inter prediction and the intra prediction is performed on the PU. An inter prediction unit 230 may perform inter prediction on a current PU on the basis of information on at least one picture among a previous picture and a subsequent picture of a current picture including the current PU. An inter prediction unit 230 may use information necessary for inter prediction for the current PU provided from the video encoding apparatus. The inter prediction may be performed on the basis of the information of the pre-reconstructed partial region in the current picture including the current PU.

In order to perform inter prediction, it may be determined, in an unit of a CU, whether a motion prediction method for a PU included in the CU is a skip mode, a merge mode, an AMVP mode or intra block copy mode.

An intra prediction unit 235 may generate a prediction block on the basis of pixel information in a current picture. When a PU is a PU for which intra prediction is performed, intra prediction may be performed based on intra prediction mode information on the PU provided from the video encoding apparatus. The intra prediction unit 235 may include an AIS (Adaptive Intra Smoothing) filter, a reference pixel interpolation unit, and a DC filter. The AIS filter performs filtering on reference pixels of a current block. The AIS filter may decide whether to apply the filter or not, depending on a prediction mode for the current PU. AIS filtering may be performed on the reference pixels of the current block using the prediction mode for the PU and information on the AIS filter provided from the video encoding apparatus. When the prediction mode for the current block is a mode not performing MS filtering, the AIS filter may not be applied.

When the prediction mode for the PU indicates a prediction mode of performing intra prediction on the basis of pixel values obtained by interpolating the reference pixels, the reference pixel interpolation unit may generate reference pixels in a unit of a fractional pixel less than an integer pixel (i.e. full pixel) by interpolating the reference pixels. When the prediction mode for the current PU indicates a prediction mode of generating a prediction block without interpolating the reference pixels, the reference pixels may not be interpolated. The DC filter may generate a prediction block through filtering when the prediction mode for the current block is the DC mode.

The reconstructed block or picture may be provided to the filter unit 240. The filter unit 240 includes a deblocking filter, an offset unit, and an ALF.

The video encoding apparatus may provide information on whether the deblocking filter is applied to a corresponding block or picture, and information on which of a strong filter and a weak filter is applied when the deblocking filter is used. The deblocking filter of the video decoding apparatus may be provided with information on the deblocking filter from the video encoding apparatus and may perform deblocking filtering on a corresponding block.

The offset unit may apply offset to the reconstructed picture on the basis of information on an offset type and offset value applied to the picture in the encoding process.

The ALF may be applied to a CU on the basis of information on whether the ALF is applied and ALF coefficient information, etc. provided from the encoding apparatus. The ALF information may be included and provided in a specific parameter set.

The memory 245 may store the reconstructed picture or block for use as a reference picture or a reference block and may provide the reconstructed picture to an output unit.

As described above, in the embodiments of the invention, the term "coding unit" is used as an encoding unit for a convenience of descriptions. However, the term "coding unit" may be also used as a unit of decoding.

Figure 3:
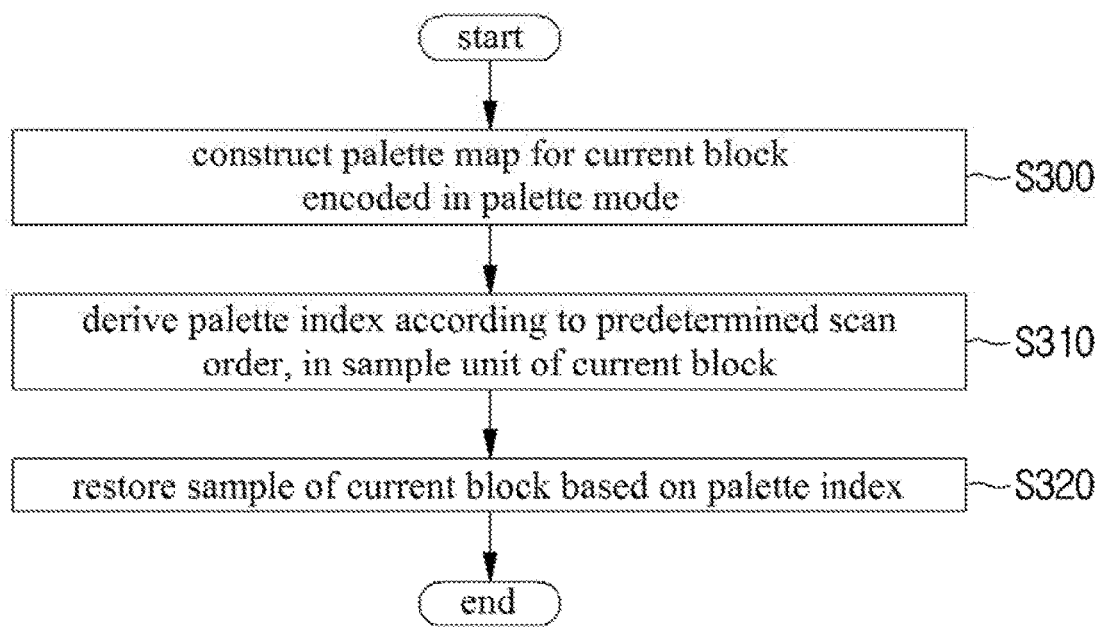
FIG. 3 illustrates a method of restoring a current block based on a palette mode according to an embodiment of the present invention.

FIG. 3 illustrates a method of restoring a current block based on a palette mode according to an embodiment of the present invention.

In the case of an image including an animation or a graphic, it may happen that all or a part of the image is composed of only a specific pixel value. In this case, a method of encoding a specific pixel value constituting the area may be used without using an inter prediction or intra prediction method, which is called a palette mode. The palette mode may be applied in a block unit (for example, a coding unit, a prediction unit). For this purpose, flag information (palette_mode_flag) indicating whether the palette mode is used may be signaled on a block basis.

Referring to FIG. 3, a palette map for a current block encoded in a palette mode may be constructed (S300).

The palette map may comprise at least one palette entry and a map index identifying each palette entry. The palette map of the current block can be derived from a palette map of the previous block (hereinafter referred to as a previous palette map). Here, the previous block may mean a block that has been encoded or decoded before the current block.

The palette entry of the current block may comprise at least one of a predicted palette entry or a signaling palette entry. The current block may use all or a part of the palette entries used by the previous block. A predicted palette entry may be representative of the palette entry reused in the current block among the palette entries used in the previous block.

Specifically, the current block may use the same palette map as the previous block. For this, a flag (palette_share_flag) indicating whether the current block uses the same palette map as the previous block may be signaled. Here, the same palette map means that the size of the palette map (or the number of palette entries included in the palette map) is the same and the palette entries included in the palette map are the same. When the value of palette_share_flag is 1, the current block uses the same palette map as the previous block. When the value of the palette_share_flag is 0, the current block may use the palette map in which at least one of the size of the palette map or the palette entries included in the palette map is different from that of the neighboring block.

Alternatively, the current block may selectively use some palette entries of the previous palette map. For this purpose, a flag (previous_palette_entry_flag, hereinafter referred to as a reuse flag) for specifying whether the palette entry is reused may be used. Specifically, the value of the reuse flag is assigned to each of the palette entries of the previous palette map. The reuse flag (previous_palette_entry_flag [i]) indicates that the palette entry corresponding to the map index i in the previous palette map is reused or not. For example, if the value of the reuse flag is 1, the palette entry corresponding to the map index i in the previous palette map is reused in the palette map of the current block. Otherwise, it is not reused. A palette map of the current block may be constructed by extracting palette entries having a reuse flag equal to 1 from the previous palette map and sequentially arranging the palette entries. The reuse flag may be signaled in the form of a flag encoded for each palette entry, or may be signaled in the form of a binary vector based on a run encoding, which will be described in detail with reference to FIG. 4 to FIG. 5.

In order to selectively use some of the palette entries in the palette map of the previous block, a re-use flag (PredictorPaletteEntryReuseFlag) for specifying whether the previous palette entry is reused and a palette prediction run (palette_predictor_run) value for specifying the number of reuse flag equal to 0 existing between non-zero reuse flags may be used. This will be described in detail with reference to FIG. 6.

In addition, the palette map of the current block may further include a signaled palette entry signaled from the bitstream. Here, the signaled palette entry includes a palette entry that is not included in the previous palette map, among the palette entries used by the current block. The method for constructing the palette map will be described by further referring to reference to FIG. 7.

Referring to FIG. 3, a palette index may be derived according to a predetermined scan order in a sample unit (or pixel unit) of the current block (S310).

As the scan order of the present invention, a horizontal scan, a vertical scan, a horizontal traverse scan, a vertical traverse scan, or the like may be used, and this will be described in detail with reference to FIG. 10.

A palette index for the current block may be derived using at least one of an index mode (INDEX MODE), a copy mode (COPY MODE) or escape mode (ESCAPE MODE). Here, the escape mode (ESCAPE MODE) may be defined as a separate mode or may be understood one example of the index mode (INDEX MODE).

Here, the index mode (INDEX MODE) may refer to a method of deriving a palette index based on encoded palette index information to specify a palette index used in the current block. The palette index information has a value between 0 and (palette size-1), wherein the palette size may indicate the size of the palette map of the current block or the number of palette entries constituting the palette map. In the index mode, the value of the signaled palette index information through the bit stream may be assigned to the palette index of the current sample. A method of deriving a palette index based on the index mode will be described in detail with reference to FIG. 8.

The copy mode (COPY MODE) may refer to a method of deriving the palette index of the current sample using the palette index of the neighboring sample. For example, in the copy mode, the palette index of the current sample may be predicted based on the palette index of the neighboring sample, or the palette index of the neighboring sample may be copied and set as the palette index of the current sample. Here, a neighboring sample may mean a sample adjacent to the top, bottom, left, or right side of the current sample. In particular, the neighboring sample may be located on the same horizontal line or the same vertical line as the current sample.

The copy mode may include at least one of a copy above mode (COPY_ABOVE MODE) in which a palette entry used by a sample adjacent to the upper end of the current sample is used as a palette entry of the current sample or a copy left mode (COPY_LEFT MODE) in which a palette entry used by a sample adjacent to the left side of the current sample is used as a palette entry of the current sample. One of the copy above mode or the copy left mode may be selectively used according to the scan order of the current block. For example, if the current block uses a horizontal scan or a horizontal traverse scan, a copy above mode may be used. If the current block uses a vertical scan or vertical traverse scan, a copy left mode may be used. In addition, the scan start position of the current block is not limited to the upper left sample, and other corner samples (for example, lower-left sample, upper-right sample, and lower-right sample) of the current block may be used as the scan start position. Therefore, according to the scan order and the scan start position of the current block, the same palette entry as the sample adjacent to the upper or left side may be used, or the same palette entry as the sample adjacent to the lower or right side may be used. In this case, the copy mode may further include a copy right mode (COPY_RIGHT MODE) and/or a copy under mode (COPY_UNDER MODE).

Alternatively, regardless of the scan order, one of the copy above mode or the copy left mode may be selectively used. For this purpose, a flag (use_copy_above_flag) specifying the scan mode may be signaled. The use_copy_above_flag may be signaled on a slice header, slice segment header, or block basis. If the value of use_copy_above_flag is 1, the copy above mode may be used in the corresponding slice or block, and if the value of use_copy_above_flag is 0, the copy left mode may be used in that slice or block. A method of deriving a palette index based on the copy mode will be described in detail with reference to FIG. 9.

A mode identifier (palette_index_mode) for specifying a method of deriving a palette index for each sample of a current block may be used to selectively use any one of the palette index modes such as the index mode and the copy mode described above. Hereinafter a method of deriving a palette index for each sample of a current block is referred to as a palette index mode. For example, if the value of the mode identifier is 1, the current sample of the current block uses the copy mode, and if the value of the mode identifier is 0, the current sample may use the index mode or the escape mode.

The mode identifier may be signaled based on a flag (use_one_palette_mode_flag) indicating whether the current block uses only one palette index mode. The use_one_palette_mode_flag may be signaled in units of blocks (for example, coding unit, prediction unit).

For example, when the current block uses only one palette index mode according to the value of use_one_palette_mode_flag, the mode identifier is not signaled through the bitstream, and the palette index mode pre-defined at the video decoding apparatus may be used as the index mode of the current block. To this end, the value of the mode identifier for each sample of the current block may be set to 1 or 0.

On the other hand, according to the value of use_one_palette_mode_flag, the current block is not limited to using only one palette index mode, and the mode identifier may be signaled through a bit stream when a plurality of palette index modes are used.

Alternatively, the mode identifier may be signaled based on a flag (palette_above_present_flag) indicating whether at least one sample in the current block uses the copy mode.

For example, if at least one of the samples in the current block uses the copy mode according to the value of palette_above_present_flag, the mode identifier may be signaled through the bitstream. On the other hand, when the samples of the current block do not use the copy mode according to the value of palette_above_present_flag, the mode identifier is not signaled through the bitstream, and the palette index mode pre-defined at the video decoding apparatus is used as the palette index mode of the current block. To this end, the value of the mode identifier for each sample of the current block may be set to zero.

Meanwhile, the palette index can also be obtained by considering an escape present flag, which will be described with reference to FIG. 11.

Referring to FIG. 3, a sample of a current block may be restored based on the palette index derived in step S310 (S320).

Specifically, the sample of the current block may be restored based on the palette map of the current block configured in step S300 and the palette index derived in step S310. A palette entry having a map index of the same value as the derived palette index is extracted from the palette map of the current block, and then the sample of the current block may be restored using the palette entry. For example, the value of the palette entry extracted from the palette map may be set to the predicted value or the restored value of the sample of the current block.

However, the value of the derived palette index may be equal to the number of palette entries constituting the palette map of the current block. In this case, the sample of the current block can be restored by using the palette entry of the palette map configured in step S300. That is, since the map index of the palette map has a value between 0 (the number of palette entries–1), the value of the derived palette index equal to the number of palette entries means that there is no palette entry corresponding to the derived palette index in the palette map configured in step S300. In this way, when a sample having a palette index of the same value as the number of palette entries in the current block exists, the sample may be determined to be encoded in an escape mode (ESCAPE MODE). Here, the escape mode may refer to a method of restoring a sample value based on a palette escape value that is additionally signaled, instead of using the palette entry of the palette map constructed in step S300. Thus, a sample having a palette index equal to the number of palette entries may be restored using the additionally signaled palette escape value.

On the other hand, the escape mode may be adaptively used based on at least one of the number of palette entries in a palette map of the current block (or palette size of the current block).

Specifically, a flag (palette_escape_val_present_flag) indicating whether the escape mode is used may be signaled only when the number of palette entries in a palette map of the current block is greater than the pre-defined threshold value. Here, if the value of an escape present flag is 1, it may mean that at least one sample included in the current block coded in the palette mode uses the escape mode. If the value of the escape present flag is 0, it may mean that the current block does not use the escape mode. Accordingly, the aforementioned palette escape value is additionally signaled when a value of the present flag relating to the current block is 1.

For example if the number of palette entries used by the current block is greater than 0, it may be allowed to reconstruct at least one sample in the current block based on the escape mode. For this purpose, an escape present flag may be signaled only when the number of palette entries used by the current block is greater than 0. Conversely, if the number of palette entries used by the current block is equal to 0, it is not allowed to reconstruct the current block based on the escape mode. In this case, an escape present flag is not signaled, and the video decoding apparatus may derive a value of the escape present flag with a pre-defined value (e.g., 0). However, the pre-defined threshold value is not limited to zero, and it may have a random constant value, rather than 0, for the encoding efficiency.

Figure 4:
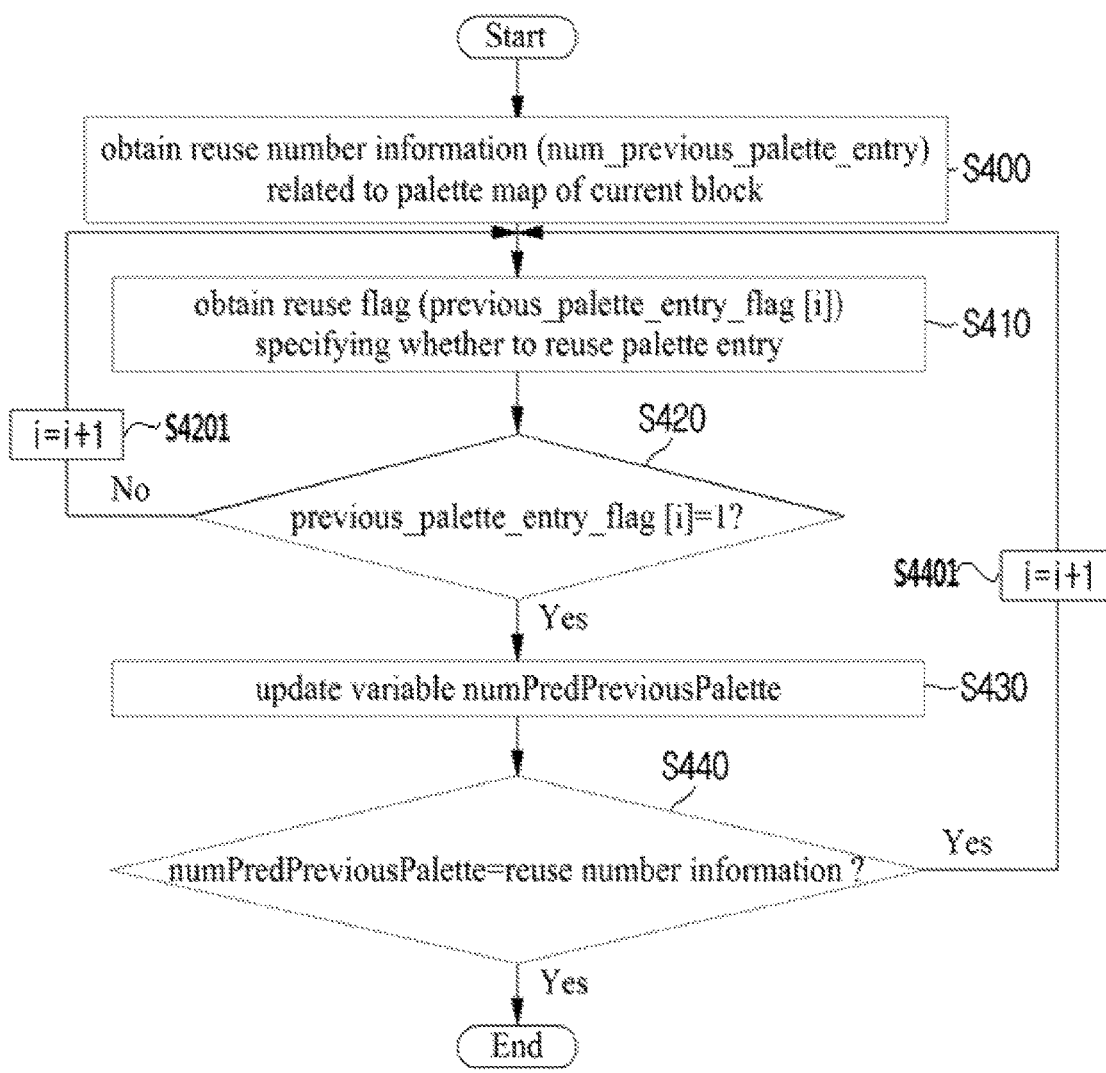
FIG. 4 illustrates a method of restrictively signaling of a reuse flag (previous_palette_entry_flag) according to an embodiment of the present invention.

FIG. 4 illustrates a method of signaling of a reuse flag (previous_palette_entry_flag) according to an embodiment of the present invention.

Referring to FIG. 4, the reuse number information (num_previous_palette_entry) related to the palette map of the current block may be obtained from the bitstream (S400).

Here, the reuse number information may mean information encoded to indicate the number of palette entries reused as palette entries of the current block among the palette entries of the previous palette map.

A reuse flag (previous_palette_entry_flag [i]) specifying whether or not the i-th palette entry is to be reused may be obtained from the bitstream (S410).

The reuse flag is signaled by the size of the previous palette map (or the number of palette entries included in the previous palette map). Here, i corresponds to a map index that identifies the palette entry of the previous palette map, and the value of i is in a range 0 to (size of the previous palette map-1).

It may be checked whether the value of the reuse flag obtained in step S410 is 1 (S420).

As a result of checking, if the value of the reuse flag is 1, a variable numPredPreviousPalette indicating the number of reuse flags equal to 1 may be updated (S430). For example, the value of the variable numPredPreviousPalette may be increased by one.

On the other hand, if the value of the reuse flag is 0, a reuse flag (previous_palette_entry_flag [i+1]) specifying whether to reuse the (i+1)-th palette entry may be obtained from the bitstream (S410).

It is possible to compare whether the variable numPredPreviousPalette value increased in step S430 and the reuse number information obtained in step S400 are the same (S440).

If the variable numPredPreviousPalette is not equal to the number information obtained in step S400, a reuse flag (previous_palette_entry_flag [i+1]) specifying whether to reuse the (i+1)-th palette entry may be obtained from the bitstream (S410). However, if the variable numPredPreviousPalette is equal to the number information obtained in step S400, a palette entry having a map index greater than the i value may not be used as a palette entry of the current block. For this, if the variable numPredPreviousPalette is equal to the number information obtained in step S400, the value of i may be derived to be equal to or larger than the size of the previous palette map. For example, the value of i may be derived by adding 1 to the size of the previous palette map. Thus, by setting the value of i to be equal to or greater than the size of the previous palette map, the reuse flag associated with the (i+1)-th palette entry may not be signaled.

Figure 5:
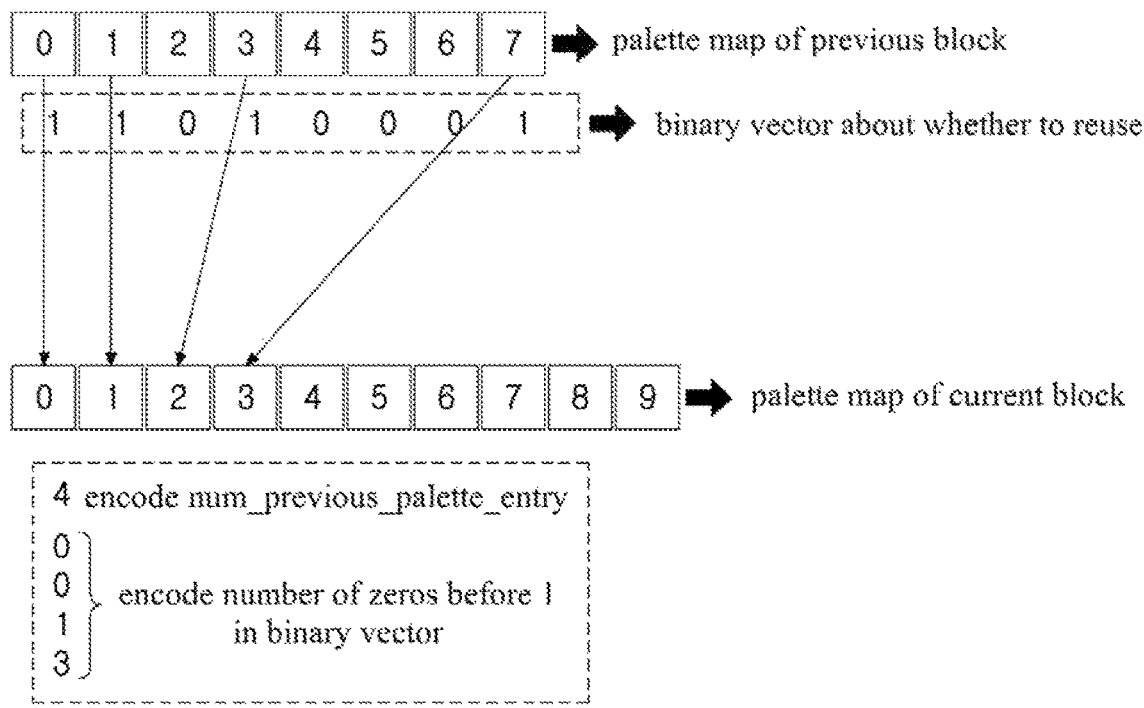
FIG. 5 illustrates a method of signaling a reuse flag in the form of a binary vector based on a run encoding, according to an embodiment of the present invention.

FIG. 5 illustrates a method of signaling a reuse flag in the form of a binary vector based on a run encoding, according to an embodiment of the present invention.

In the present embodiment, it is assumed that the palette map of the previous block uses eight palette entries having a map index of 0 to 7.

For each of the palette entries of the previous block with index 0 to 7, the video encoding apparatus determines whether the palette entry is reused as a palette entry of the current block. If the palette entry is reused as a palette entry of the current block, the value of the reuse flag for the palette entry may be set to be 1, and otherwise, it may be set to be 0. For example, as shown in FIG. 5, when the palette entries of 0, 1, 3, and 7 among the palette entries of the previous block are reused as palette entries of the current block and the remaining palette entries are not reused, a binary vector represented by 11010001 may be generated.

Then, at least one of the number of 1's in the binary vector (i.e., the number of palette entries reused as a palette entry of the current block in the previous block) or the number of zeros earlier than 1 in the binary vector is encoded, and then it may be signaled to the video decoding apparatus. For example, since the number of 1's in the binary vector is 4, 4 may be encoded as the number of palette entries of the previous block reused as the palette entry of the current block. In addition, the number of zeros preceding the 1 in the binary vector, that is, 0, 0, 1, and 3, may be sequentially encoded.

The video decoding apparatus may receive, from the video encoding apparatus, at least one of information (num_previous_palette_entry) about the number of palette entries of a previous block reused as palette entries of the current block or information (palette_entry_run) about the number of zeros preceding the 1 in the binary vector, and then construct a palette map of the current block by using it.

For example, the video decoding apparatus successively extracts information (palette entry run) about the number of zeros preceding the 1 in the binary vector, that is, 0, 0, 1, and 3, from the bitstream. The binary vector indicating whether to reuse the palette entry of a previous block, that is, 11010001 may be restored by using the extracted information. When a value of 1 is generated in the process of restoring the binary vector, the palette entry of the previous block corresponding to the value 1 may be inserted into the palette map of the current block. Through this process, a palette map of the current block may be constructed by selectively reusing some palette entries from the palette map of the previous block.

Figure 6:
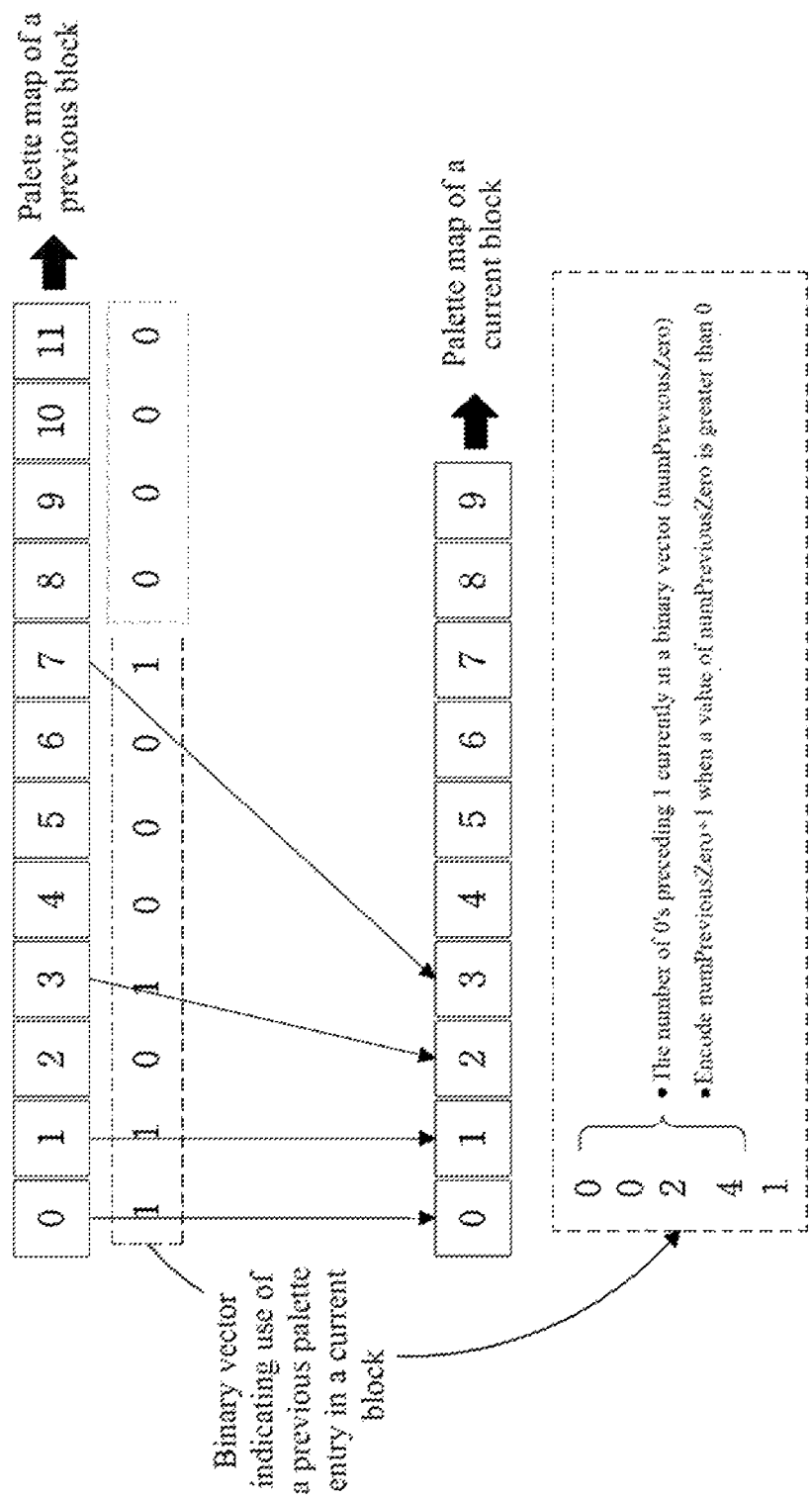
FIG. 6 illustrates a method for obtaining a predicted palette entry of a current block based on syntax palette_predictor_run, according to an embodiment of the present invention.

FIG. 6 illustrates a method for obtaining a predicted palette entry of a current block based on syntax palette_predictor_run, according to an embodiment of the present invention.

As shown in FIG. 6, it is assumed that a palette map of a previous block is composed of 12 palette entries with map indexes of 0 to 11.

First, a process of encoding a syntax palette_predictor_run in the video encoding apparatus will be described. The video encoding apparatus may determine whether each palette entries of 0 to 11 included in the palette map of the previous block is reused as a palette entry of the current block. If the palette entry is reused as the palette entry of the current block, the value of a reuse flag (PredictorPaletteEntryReuseFlag) for the palette entry may be set to 1, otherwise, it may be set to 0.

For example, as shown in FIG. 6, when the palette entries 0, 1, 3 and 7 among the palette entries of the previous block are reused as the palette entries of the current block and the remaining palette entries are not reused, a binary vector represented by 110100010000 may be generated.

Then, at least one of palette_predictor_run for specifying the number of 1's in the binary vector (i.e., the number of palette entries reused as palette entries of the current block among the palette entries of the previous block) or the number of 0's preceding 1 in the binary vector may be encoded to specify a palette entry to be reused as the palette entry of the current block from the palette entries of the previous block.

Concretely, palette_predictor_run may be encoded using numPreviousZero, which is a variable indicating the number of 0's preceding 1 in the binary vector. If the value of numPreviousZero is greater than 0, then the value of (numPreviousZero+1) may be encoded as palette_predictor_run. Otherwise (for example, if the value of numPreviousZero is zero), the value of numPreviousZero (e.g., 0) may be encoded as palette_predictor_run.

Meanwhile, as shown in FIG. 6, there may be case where palette entries after palette entry 7 are not reused as the palette entry of the current block. It is necessary for the video encoding apparatus to signal that palette entries after the palette entry 7 no longer reused as the palette entry of the current block. For this purpose, a value of palette_predictor_run can be encoded as 1. That is, if the value of palette_predictor_run is 1, this means that palette_predictor_run is no longer encoded in the current block. It is possible to control whether or not the process of acquiring the predicted palette entry of the current block from the palette map of the previous block is finished based on the value of the encoded palette_predictor_run.

Referring to FIG. 6, in the case of palette entries 0 and 1 of the previous block, since the value of the variable numPreviousZero indicating the number of 0's preceding 1 is 0, it is possible to encode 0 as the value of palette_predictor_run. In the case of palette entry 3 of the previous block, since the value of the variable numPreviousZero indicating the number of 0's preceding 1 is 1, the value of (numPreviousZero+1), i.e., 2 may be encoded as the value of palette_predictor_run. In the case of palette entry 7 of the previous block, since the value of the variable numPreviousZero indicating the number of 0's preceding 1 is 3, the value of (numPreviousZero+1), i.e., 4, may be encoded as the value of palette_predictor_run. Since palette entries after palette 7 are not reused as the palette entry of the current block, 1 may be encoded as the value of palette_predictor_run.

The palette_predictor_run for the current block may be encoded as many as the number of palette entries reused as the palette entry of the current block among the palette entries of the previous block (i.e., the number of 1's in the binary vector), or may encoded as many as a value by adding 1 to the number of 1's in the binary vector. The number of palette_predictor_run encoded for the current block may be determined based on whether the maximum value (MaxIndex) of the map index of the previous palette map is equal to the maximum value (MaxReuseIdx) among the map indexes of the palette entries of the previous block which are reused for the current block. For example, if MaxReuseIdx is equal to MaxIndex, palette_predictor_run may be encoded as many as the number of 1's in the binary vector. Otherwise (e.g., if MaxReuseIdx is less than MaxIndex) it may be encoded as many as a value adding 1 to the number of 1's in the binary vector.

The video decoding apparatus may derive a flag (PredictorPaletteEntryReuseFlag) indicating whether the palette entry of the previous block is reused based on the signaled palette_predictor_run. For example, if the value of PredictorPaletteEntryReuseFlag[idx] is 1, it may mean that the palette entry corresponding to the map index idx is reused as the palette entry of the current block. If the value is 0, it may mean that the palette entry corresponding to the map index idx is not reused as the palette entry of the current block. A initial value of PredictorPaletteEntryReuseFlag may be set to 0.

Specifically, a value of PredictorPaletteEntryReuseFlag [idx-1] for the palette entry of the map index (idx-1) is 1, and palette_predictor_run is obtained for the map index idx. If a value of palette_predictor_run is greater than 1, the value of PredictorPaletteEntryReuseFlag[idx+palette_predictor_run-1] may be set to 1 for a palette entry having a map index (idx+palette_predictor_run-1). If the value of palette_predictor_run is 0, the value of PredictorPaletteEntryReuseFlag[idx] may be set to 1 for a palette entry having a map index idx. If the value of palette_predictor_run is 1, this indicates that no more palette entries in palette entries of the previous block is reused, and a value of the maximum map index among palette entries of the previous block which are reused for the current block would be (idx-1).

A process of determining a predicted palette entry based on palette_predictor_run in the video decoding apparatus will be described with reference to FIG. 6. First, the palette_predictor_run for the palette entry 0 in the palette map of the previous block may be obtained from the bitstream. Since the value of palette_predictor_run is 0, the value of PredictorPaletteEntryReuseFlag[0] for the palette entry 0 is set to 1, and the palette entry 0 is included in the palette map of the current block. The palette_predictor_run for the palette entry 1 in the palette map of the previous block may be obtained from the bitstream. Since the value of palette_predictor_run is 0, the value of PredictorPaletteEntryReuseFlag[1] for the palette entry 1 is set to 1, and the palette entry 1 is also included in the palette map of the current block. The palette_predictor_run for the palette entry 2 in the palette map of the previous block may be obtained from the bitstream. Since the value of palette_predictor_run is set to 2, a value of PredictorPaletteEntryReuseFlag [3] for the palette entry located at (idx+palette_predictor_run-1), i.e., palette entry 3 is set to 1 and the palette entry 3 is included in the palette map of the current block. Palette_predictor_run for palette entry 4 in the palette map of the previous block may be obtained from the bitstream. Since a value of the palette_predictor_run is 4, a value of PredictorPaletteEntryReuseFlag[7] for the palette entry located at (idx+palette_predictor_run-1), i.e., palette entry 7 is set to 1 and the palette entry 7 is included in the palette map of the current block. Through the above process, the predicted palette entry of the current block is obtained from the palette map of the previous block. This process can be performed until palette_predictor_run reaches 1, as described above.

FIG. 7 illustrates a method of constructing a palette map of a current block, according to an embodiment of the present invention.

A current block may use a palette map same as a palette map of a previous block. Thus, a flag (palette_share_flag) indicating whether a size of the palette map (or the number of palette entries) of the current block is equal to a size of the palette map (or the number of palette entries) of the previous block and the current block uses the palette map same as the palette map of the previous block may be used for this purpose. For example, if a value of palette_share_flag is 1, it may mean that the size of the palette map and a palette entry of the current block are same with the previous block. On the other hand, if a value of palette_share_flag is 0 (i.e., in case of when at least one of the size of the palette map or a palette entry of the current block is different from the previous block), the current block may selectively use a portion of palette entries of a previous palette map, or may use an additional palette entry beyond the palette entries of the previous palette map.

A flag (previous_palette_entry_flag[i]) indicating whether a palette entry is reused may be used for selectively using all or a part of the palette entries of the previous palette map. For example, if a value of previous_palette_entry_flag[i] is 1, it may mean that i-th palette entry in the previous palette map is reused as a palette entry of the current block. If a value of previous_palette_entry_flag[i] is 0, it may mean that the i-th palette entry is not reused as a palette entry of the current block. previous_palette_entry_flag[i] may be signaled as many as the number of palette entries included in the previous palette map.

When a current block additionally uses a palette entry (hereinafter, referred to as a signaling palette entry) which is not included in the previous palette map, an video encoding apparatus may encode the number of signaling palette entries and signaling palette entries as many as the number of signaling palette entries. For example, if the number of palette entries included in the previous palette map is equal to the number of predicted palette entries of the current block, it may mean that at least one signaling palette entry is used for the current block. Therefore, the video encoding apparatus may encode a value (palette_num_signalled_entries_minus1, hereinafter, referred to as first signaling entry number information) derived by subtracting 1 from the number of signaling palette entries. If the number of palette entries included in the previous palette map and the number of predicted palette entries of the current block are not same, the video encoding apparatus may encoded the number of signaling palette entries (palette_num_signalled_entries, hereinafter, referred to as second signaling palette entries).

The video decoding apparatus may determine the number of signaling entries, considering whether the number of predicted palette entries of the current block and the number of palette entries included in the previous palette are the same.

Referring to FIG. 7, the video decoding apparatus may obtain second signaling entry number information when the number of predicted palette entries (paletteNumPredictedEntries) of the current block and the number of palette entries (previousPaletteSize) included in the previous palette are not same (S700). In this case, the number of signaling palette entries of the current block may be derived to the same value as a value of the second entry number information.

Meanwhile, first signaling entry number information may be obtained when paletteNumPredictedEntries and previousPaletteSize are identical (S710). In this case, the number of signaling palette entries of the current block may be derived by adding 1 to the first signaling entry number information.

Signaling palette entries may be obtained from the bitstream as many as the number of signaling palette entries of the current block (S720). A current palette map may be constructed by using palette entries predicted from a previous palette map and the signaled palette entries. A size of the current palette map (or, the number of palette entries included in the current palette map, CurrentPaletteSize) may be derived as follows based on a size of a previous palette map (or, the number of palette entries included in the previous palette map) and/or whether paletteNumPredictedEntries and previousPaletteSize are the same.

(1) when a value of palette_share_flag is equal to 1

CurrentPaletteSize=previousPaletteSize (2) when a value of palette_share_flag is equal to 0, and when paletteNumPredictedEntries and previousPaletteSize are the same CurrentPaletteSize=previousPaletteSize+palette_num_signalled_entries_minus1+1

Figures 8, 9:
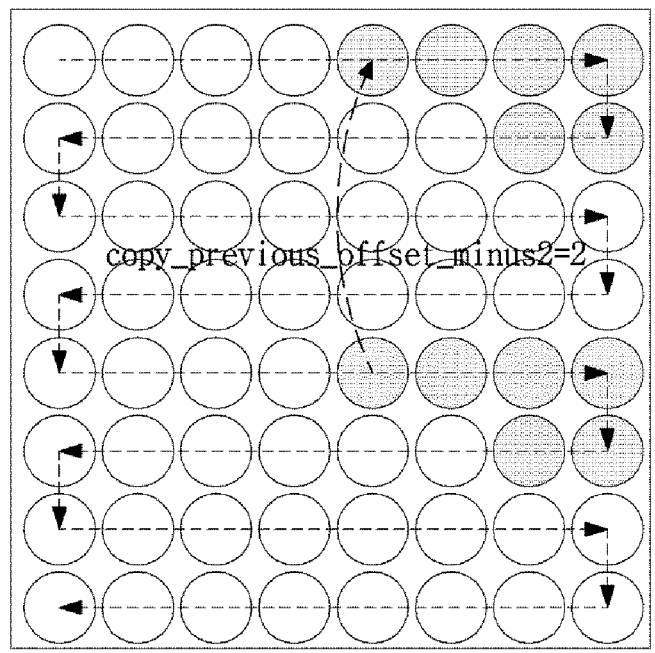
FIG. 8 illustrates a method of deriving a palette index of a current block based on palette index information and a palette index run according to an embodiment of the present invention.
FIG. 9 illustrates a method to derive a palette index based on a copy mode (COPY MODE), according to an embodiment of the present invention.

(3) when a value of palette_share_flag is equal to 0, and when paletteNumPredictedEntries and previousPaletteSize are different CurrentPaletteSize=previousPaletteSize+palette_num_signalled_entries FIG. 8 illustrates a method of deriving a palette index of a current block based on palette index information and a palette index run according to an embodiment of the present invention.

First, the process of encoding the palette index information and the palette index run in the video encoding apparatus will be described. For convenience of explanation, it is assumed that that the current block is encoded in the index mode, as shown in FIG. 8, each sample uses a palette index in the range of 0 to 3, and a horizontal traverse scan in which the upper-left sample of the current block is the start position is used.

Referring to FIG. 8, if the palette index used by the current block is arranged in a one-dimensional form according to the horizontal traverse scan order, it may be expressed as the following {0, 2, 2, 2, 3, 3, 3, 3, 2, 0, 0, 0, 0, 1, 1, 1}. The one-dimensional array may be grouped into successive and equal-valued palette indices. That is, the one-dimensional array may be composed of a first group consisting of one 0 value, a second group consisting of three 2 values, a third group consisting of four 3 values, a fourth group consisting of one 2 value, a fifth group consisting of four 0 values, and a sixth group consisting of three 1 values. The redundancy of the palette indexes for each group is removed. As shown in Table 1 below, palette index information and/or information about the number of palette indices to be encoded may be generated by specifying and encoding palette indices to be encoded and/or the number of palette indices to be encoded.

TABLE 1

| Group | | Palette index to be encoded | Palette index information | Palette index run |
|---|---|---|---|---|
| 1 | {0} | 0 | 0 | 0 |
| 2 | {2, 2, 2} | 2 | 2 | 2 |
| 3 | {3, 3, 3, 3} | 3 | 3 | 3 |
| 4 | {2} | 2 | 2 | 0 |
| 5 | {0, 0, 0, 0} | 0 | 0 | 3 |
| 6 | {1, 1, 1} | 1 | 1 | 2 |

That is, {0, 2, 3, 2, 0, 1} may be obtained by eliminating the redundancy of the palette index for each group. In this case, the palette index to be encoded is specified as {0, 2, 3, 2, 0, 1}, and the number of palette indices to be encoded may be specified to be six.

In addition, the video encoding apparatus may encode the number of times the same palette index is repeated for each group (hereinafter referred to as a palette index run). For example, as shown in Table 1, since the first group is composed of one 0 value, the palette index run is determined to be 0. In the second group, since the palette index 2 is used at the sample having the scan order (1) and the same palette indices 2 are successively used at the samples having scan orders (2) and (3), the palette index run may be determined to be 2. The video encoding apparatus may encode the determined value of the palette index run as it is or may divide it into the most significant bit (MSB) and the refinement bit for encoding efficiency.

Through the above-described process, the palette index used for the current block may encoded as at least one of the information about the number of palette indices to be encoded, the palette index information about the palette indices to be encoded, or the palette index run at the video encoding apparatus.

In the encoding process, there is a case where the same palette index occurs from the current sample to the last sample in the scan order (run-to-end). A palette index run may be set to a predetermined constant value to inform to the video decoding apparatus that a run-to-end has occurred. For example, it is possible to indicate that all samples from a current sample to the last sample of the current block in the scan order have the same palette index by setting the value of the palette index run to 3.

A value of a palette index run indicating a run-to-end may be set differently depending on at which position the current sample is in the scan order or to which row/column it included. For example, if the current sample belongs to the first row, a value of a palette index run may be set to 8 to indicate that a run-to-end has occurred. If the current sample is located on the third row, a value of a palette index run may be set to 8 to indicate that a run-to-end has occurred. Alternatively, when a scan order of the current sample is larger than the intermediate value of the current block size (nCbs*nCbs), a value of the palette index run may be set to 6 to indicate that a run-to-end has occurred. Conversely, if a scan order of the current block is smaller than the intermediate value of the current block size (nCbs*nCbs), the value of the palette index run may be set to 2 to indicate that a run-to-end has occurred.

The video decoding apparatus may obtain the palette index information and the palette index run from the bit stream and derive the palette index for each sample of the current block using the palette index information and the palette index run.

The palette index information may be obtained as many as the number corresponding to information on the number of palette indices to be encoded. A palette index run corresponding to each palette index information may be sequentially obtained to derive a palette index of the current block. For example, the video decoding apparatus may obtain palette index information of {0, 2, 3, 2, 0, 1} from the bit stream. Then, a palette index run corresponding to palette index information 0 may be obtained from the bitstream. If the value of the palette index run corresponding to the palette index information 0 is 0, the video decoding apparatus may assign the palette index 0 to the sample having the scan order (0) of the current block. Then, a palette index run corresponding to palette index information 2 may be obtained from the bitstream. If the value of the palette index run corresponding to the palette index information 2 is 2, the video decoding apparatus may sequentially assign the palette index 2 to the samples having the scan order (1) to (3) of the current block according to the scan order. In this way, a palette index may be derived for all samples in the current block.

Meanwhile, a palette index of the current sample may be encoded/decoded based on a palette index of the previous sample, which will be described in detail with reference to FIG. 12.

FIG. 9 illustrates a method of deriving a palette index based on a copy mode (COPY MODE), according to an embodiment of the present invention.

The copy mode may be a mode in which a palette index of a neighboring sample decoded before the current sample is copied and used as a palette index of the current sample. Here, a neighboring sample may mean a top or a left neighboring sample adjacent to the current sample, or may mean a top or a left neighboring sample that is not adjacent to the current sample. The top neighboring sample may be in the same column as the current sample and the left neighboring sample may be in the same row as the current sample. An offset may be used to specify a neighboring sample (hereinafter, referred to as a reference sample) used in the copy mode. Here, the offset may represent a positional difference (e.g., a row or a column difference) between the current sample and the reference sample. The offset may be encoded with a position difference between the current sample and the reference sample or may be encoded into a value obtained by subtracting a constant value from the offset (e.g., copy_previous_offest_minus1, copy_previous_offest_minus2). In this case, the video decoding apparatus may restore the offset by adding a constant value to the encoded offset.

Samples having the same offset as the current sample may be generated sequentially. In this case, offsets may not be encoded for each sample through run encoding. For example, a value (copy_run, hereinafter, referred to as copy run) indicating the number of consecutive samples having the same offset as the current sample may be encoded. The value of the copy run may be limited to a predetermined range. For example, if the current sample uses COPY_ABOVE MODE, the value of the copy run cannot be greater than the width of the current block. Because, if the value of the copy run is greater than the width of the current block, the neighboring sample that has not yet been decoded is used as a reference sample. Or, if the current sample uses a neighboring sample that is not adjacent to the current sample, the value of the copy run cannot be greater than the offset*width of the current block (nCbs). Similarly, when the value of the copy run is greater than the offset*width of the current block (nCbs), the neighboring sample that has not yet been decoded is used as a reference sample.

Meanwhile, a reference sample of the present invention may be limited to a sample in a current block (e.g., a coding block or a prediction block) or may be limited to a sample in a predetermined area further including a neighboring block adjacent to the current block.

If a reference sample is included in a neighboring block adjacent to the current block, the reference sample may be determined by using offset and/or block identification information. Here, the block identification information means information specifying a neighboring block including a reference sample, and may include location/size information of a neighboring block, block partition information, and the like. Specifically, in the neighboring block specified by the block identifying information, a sample at the position shifted as much as the offset from a sample have same position as the current sample may be determined as the reference sample.

Or, if a reference sample is limited to a sample in the current block, the encoded offset may optionally be used according to the location of the current sample in the current block (e.g., the row and/or column in which the current sample is located). For example, if the current sample is located in the third row of the current block and the current sample uses a neighboring sample that is not adjacent to the current sample as a reference sample, then the current sample may not use the encoded offset. In this case, the offset for the current sample is derived as 0, and the palette index of the current sample can be derived by copying the palette index of the reference sample located in the first row.

Figure 10:
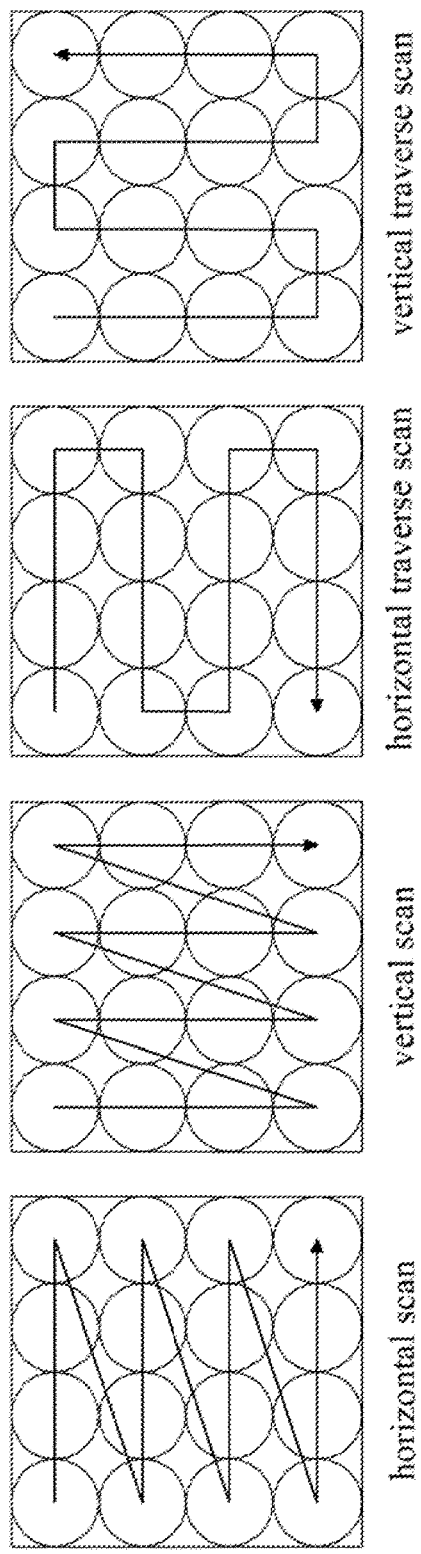
FIG. 10 illustrates a scan order in the palette mode according to an embodiment of the present invention.

FIG. 10 illustrates a scan order used in the palette mode according to an embodiment of the present invention.

Referring to FIG. 10, the scan order used in the palette mode includes a horizontal scan, a vertical scan, a horizontal traverse scan, and a vertical traverse scan.

Specifically, the horizontal scan is a method of scanning each row of the current block from left to right, and the vertical scan is a method of scanning each column of the current block from top to bottom.

The horizontal traverse scan is a method of scanning the odd rows of the current block from left to right and the even rows from right to left. A vertical traverse scan is a method in which odd columns of the current block is scanned from top to bottom while an even columns are scanned from bottom to top.

However, in this embodiment, it is assumed that the upper-left sample of the current block is set to be the scan start position, but the present invention is not limited to this, and another corner sample of the current block may be set to be the scan start position.

FIG. 11 illustrates a method to obtain a palette index based on an escape present flag, according to an embodiment of the present invention.

Referring to FIG. 11, an escape present flag (palette_escape_val_present_flag) may be obtained based on the number of palette entries (CurrentPaletteSize) constituting the current palette map (S1100). For example, an escape present flag may be obtained when CurrentPaletteSize is not 0. This means that it is determined whether at least one sample in the current block uses the escape mode only when there is at least one palette entry in the current palette map.

A Palette index mode and/or a palette index for each sample may be obtained based on at least one of palette_escape_val_present_flag and CurrentPaletteSize.

Specifically, referring to FIG. 11, when a value of palette_escape_val_present_flag and a value of CurrentPaletteSize are not 1, a mode identifier (palette_run_type_flag) identifying the palette index mode can be obtained from a bitstream (S1110).

Either a copy mode or an index mode may be determined as a palette index mode of the current sample according to a value of palette_run_type_flag. On the other hand, if at least one of palette_escape_val_present_flag or CurrentPaletteSize is not 1, palette_run_type_flag is not signaled and the palette index mode of the current sample may be set to escape mode.

If the current sample uses the index mode according to the palette_run_type_flag obtained in step S1110, the palette index (palette_index_idc) may be obtained from the bitstream (S1120).

As shown in FIG. 11, palette_index_idc may be obtained only when the values of palette_escape_val_present_flag and CurrentPaletteSize are not equal to 1.

If at least one of palette_escape_val_present_flag or CurrentPaletteSize is 1, palette_index_idc is not signaled through the bitstream and may be derived based on the value of CurrentPaletteSize. Specifically, the palette_index_idc may be derived through an addition operation or a subtraction operation in which a variable (CurrentPaletteSize) related to the number of palette entries belonging to the current palette map and a predetermined constant value are inputted. Here, the predetermined constant value may be a variable value that is determined dependent on the CurrentPaletteSize, or a pre-defined fixed constant value. For example, palette_index_idc may be derived by adding 1 to CurrentPaletteSize.

Figure 12:
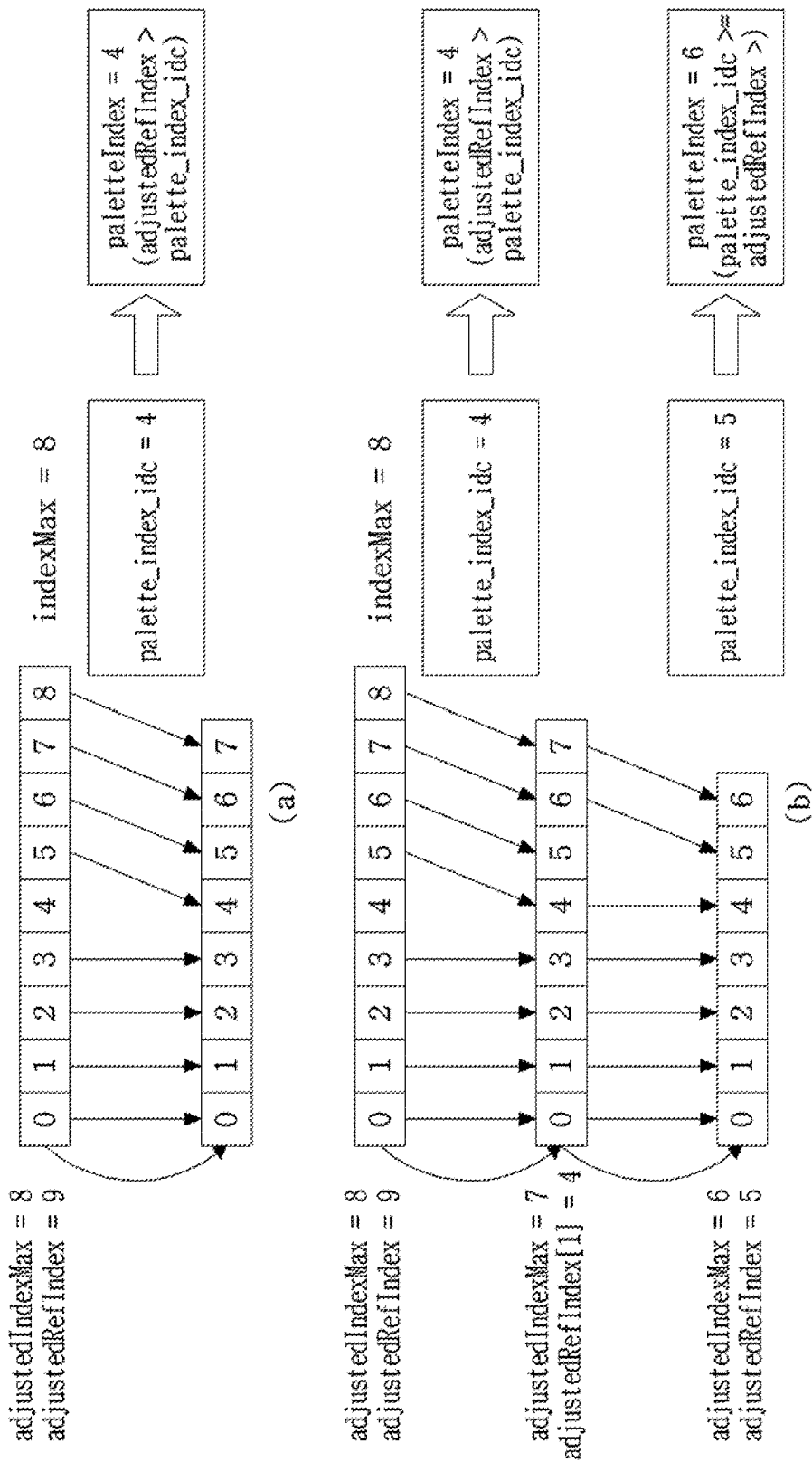
FIG. 12 illustrates a method to encode/decode a palette index of a current sample considering a palette index of a previous sample, according to an embodiment of the present invention.

FIG. 12 illustrates a method to encode/decode a palette index of a current sample considering a palette index of a previous sample, according to an embodiment of the present invention.

As shown in FIG. 8, a palette index for index mode may be encoded into palette index information (palette_index_idc). When the palette index of the current sample is encoded, if the palette index of the current sample is larger than the palette index of the previous sample, the palette index of the current sample may be adjusted and encoded.

Specifically, referring to FIG. 12(a), if the palette index of the current sample (paletteIndex) is greater than the palette index of the previous sample (adjustedRefindex), the palette index of the current sample is adjusted to (paletteIndex-1), and a value of paletteIndex-1 may be encoded into a value of palette index information. Accordingly, in the decoding process, the palette index (paletteIndex) of the current sample may be derived by adding 1 to the value of the signaled palette index information.

The palette index (paletteIndex) of the current sample may be derived by comparing the palette index information (palette_index_idc) of the current sample with the palette index (paletteIndex) of at least one previous sample.

If palette index information (palette_index_idc) related to the current sample is equal to or greater than a palette index (paletteIndex) of the previous sample as a result of comparison between the palette index information (palette_index_idc) of the current sample and the palette index (paletteIndex) of the previous sample, a palette index (paletteIndex) of the current sample may be derived by adding 1 to the value of the palette index information (palette_index_idc) related to the current sample.

As shown in FIG. 12(b), when comparing with palette indexes of a plurality of previous samples, the number of palette indexes of the previous samples having a value equal to or less than the palette index information (palette_index_idc) related to the current sample is counted, and the palette index (paletteIndex) of the current sample may be derived by increasing a value of the palette index information (palette_index_idc) related to the current sample by the corresponding number.

Alternatively, when comparing with palette indexes of a plurality of previous samples, the comparing process may be performed in a pre-defined order. For example, when palette indexes of a plurality of previous samples include a first palette index (paletteIndex_1) of a first previous sample and a second palette index (paletteIndex_2) of a second previous sample, the comparison process is performed in the order of the first previous sample to the second previous sample and will be described in detail.

First, the palette index information (palette_index_idc) related to the current sample and the first palette index (paletteIndex_1) of the first previous sample may be compared. If a value of the palette index information (palette_index_idc) related to the current sample is equal to or greater than the first palette index (paletteIndex_1), the palette index (paletteIndex) of the current sample is obtained by adding 1 to the palette index information (palette_index_idc), or else, it may be derived to be equal to the value of palette index information (palette_index_idc).

Then, the palette index (paletteIndex) of the current sample derived previously is compared with the second palette index (paletteIndex_2) of the second previous sample, and a final palette index (paletteIndex) of current sample is derived by adding 1 to the palette index (paletteIndex) of the current sample or derived as same value as the palette index of the current sample.

INDUSTRIAL AVAILABILITY

The present invention can be used to encode/decode a video signal.

The invention claimed is:

1. A method of decoding a video signal, the method comprising:
   obtaining at least one palette entry of a current block from a palette map of a previous block;
   constructing a palette map of the current block, the palette map of the current block comprises the at least one palette entry and a map index for identifying each palette entry;
   deriving a palette index on a sample-by-sample basis of the current block; and
   reconstructing each sample of the current block by using a palette entry having a map index of the same value as the derived palette index from the palette map,
   wherein the palette entry comprises at least one of a predicted palette entry and a signaled palette entry, the predicted palette entry means a palette entry reused in the current block among palette entries included in the palette map of the previous block, and the signaled palette entry indicates a palette entry not included in the palette map of the previous block among the palette entries used by the current block, wherein the predicted palette entry is derived from information about palette entry run, the information about palette entry run is used to determine a number of zeros that precede a non-zero entry in palette entries in the previous block, wherein when the palette index is encoded in an index mode, the palette index is derived from information about palette index run, the information about palette index run is used to determine a repeated number of times of same palette index in a predetermined scan order, wherein when the palette index is encoded in a copy mode, the palette index is derived from information about copy run, the information about copy run is used to determine whether palette indices of last positions in current samples are copied from palette indices in the row above, and wherein a value of the palette index run is entropy encoded selected from one of two encoded types based on a number of bits used,
- as a first encoded type, a value of the palette index run is derived from a single encoded element that represents the value of the palette index run as is,
- as a second encoded type, a value of the palette index run is derived from two encoded elements that represent a most significant bit (MSB) value as is and refinement bits as is of the value of the palette index run.

2. The method of claim 1, wherein a palette entry of the current block is determined based on a reuse flag (PredictorPaletteEntryReuseFlag) indicating whether a palette entry included in a palette map of the previous block is reused as a palette entry of the current block.

3. The method of claim 2, wherein the reuse flag is derived based on the information about palette entry run signaled from a bitstream, and wherein the information about palette entry run is encoded by adding 1 to a number of a reuse flag equal to 0 existing between non-zero reuse flags.

4. The method of claim 3, wherein if a value of the information about palette entry run is 1, a step of obtaining palette entry of a current block from a palette map of the previous block is ended.

5. The method of claim 1, wherein the predetermined scan order is a horizontal traverse scan order.

6. A method of encoding a video signal, the method comprising:
- obtaining at least one palette entry of a current block from a palette map of a previous block;
- constructing a palette map of the current block, the palette map of the current block comprises the at least one palette entry and a map index for identifying each palette entry;
- determining a palette index in a unit of a sample of the current block; and
- reconstructing each sample of the current block by using a palette entry having a map index of the same value as the derived palette index from the palette map, wherein the palette entry comprises at least one of a predicted palette entry and a signaled palette entry, and wherein the predicted palette entry means a palette entry reused in the current block among palette entries included in the palette map of the previous block, and the signaled palette entry indicates a palette entry not included in the palette map of the previous block among the palette entries used by the current block, wherein the predicted palette entry is derived from information about palette entry run, the information about palette entry run is signaled to determine a number of zeros that precede a non-zero entry in palette entries in the previous block, wherein when the palette index is encoded in an index mode, the palette index is derived from information about palette index run, the information about palette index run is signaled to determine a repeated number of times of same palette index in a predetermined scan order, wherein when the palette index is encoded in a copy mode, the palette index is derived from information about copy run, the information about copy run is signaled to determine whether palette indices of last positions in current samples are copied from palette indices in the row above, and wherein a value of the palette index run is selected from one of two encoded types based on a number of bits to use,
- as a first encoded type, a value of the palette index run is derived from a single encoded element that represents the value of the palette index run as is,
- as a second encoded type, a value of the palette index run is derived from two encoded elements that represent a most significant bit (MSB) value as is and refinement bits as is of the value of the palette index run.

7. The method of claim 6, wherein a palette entry of the current block is determined based on a reuse flag (PredictorPaletteEntryReuseFlag) indicating whether a palette entry included in a palette map of the previous block is reused as a palette entry of the current block.

8. The method of claim 7, wherein the reuse flag is derived based on an encoded the information about palette entry run, and
wherein the information about palette entry run is encoded by adding 1 to a number of a reuse flag equal to 0 existing between non-zero reuse flags.

9. The method of claim 8, wherein if a value of the encoded information about palette entry run is 1, a step of obtaining palette entry of a current block from a palette map of the previous block is ended.

10. The method of claim 6, wherein the predetermined scan order is a horizontal traverse scan order.

* * * * *